(12) United States Patent
Lehtiniemi et al.

(10) Patent No.: US 9,910,519 B2
(45) Date of Patent: Mar. 6, 2018

(54) METHOD AND APPARATUS FOR OPERATION DESIGNATION

(71) Applicant: Nokia Technologies Oy, Espoo (FI)

(72) Inventors: Arto Juhani Lehtiniemi, Lempäälä (FI); Antti Johannes Eronen, Tampere (FI); Juha Henrik Arrasvuori, Tampere (FI); Jukka Antero Holm, Tampere (FI)

(73) Assignee: Nokia Technologies Oy, Espoo (FI)

(*) Notice: Subject to any disclaimer, the term of this patent is extended or adjusted under 35 U.S.C. 154(b) by 13 days.

(21) Appl. No.: 14/895,200

(22) PCT Filed: Jun. 21, 2013

(86) PCT No.: PCT/US2013/047143
§ 371 (c)(1),
(2) Date: Dec. 1, 2015

(87) PCT Pub. No.: WO2014/204490
PCT Pub. Date: Dec. 24, 2014

(65) Prior Publication Data
US 2016/0117006 A1  Apr. 28, 2016

(51) Int. Cl.
| G06F 3/041 | (2006.01) |
| G06F 3/01 | (2006.01) |
| G06F 3/03 | (2006.01) |
| G06F 3/0362 | (2013.01) |
| G06F 3/048 | (2013.01) |
| H04M 1/725 | (2006.01) |

(52) U.S. Cl.
CPC ............. *G06F 3/041* (2013.01); *G06F 3/011* (2013.01); *G06F 3/0312* (2013.01); *G06F 3/0362* (2013.01); *G06F 3/048* (2013.01); *H04M 1/72533* (2013.01)

(58) Field of Classification Search
CPC ........ G06F 3/041; G06F 3/011; G06F 3/0312; G06F 3/0362; G06F 3/048; H04M 1/72533
USPC .......................................................... 345/173
See application file for complete search history.

(56) References Cited

U.S. PATENT DOCUMENTS

| 5,757,929 A | 5/1998 | Wang et al. |
| 6,216,490 B1 | 4/2001 | Radley-Smith |
| (Continued) |

FOREIGN PATENT DOCUMENTS

| EP | 1 259 135 A1 | 11/2002 |
| EP | 1 311 126 A2 | 5/2003 |
| (Continued) |

OTHER PUBLICATIONS

International Search Report and Written Opinion received for corresponding Patent Cooperation Treaty Application No. PCT/US2013/047143, dated Mar. 25, 2014, 10 pages.

(Continued)

*Primary Examiner* — Nicholas Lee
*Assistant Examiner* — Ngan T Pham Lu
(74) *Attorney, Agent, or Firm* — Alston & Bird LLP

(57) ABSTRACT

Method for receiving an indication of an input from a separate apparatus comprising beads, determining that the separate apparatus is associated with a designated operation of a designated program, and performing the designated operation based on the bead input.

17 Claims, 17 Drawing Sheets

(56) References Cited

U.S. PATENT DOCUMENTS

| | | | |
|---|---|---|---|
| 6,920,606 | B1 | 7/2005 | Jablonski et al. |
| 8,098,141 | B2 | 1/2012 | Vanska et al. |
| 8,872,729 | B2 | 10/2014 | Lyons et al. |
| 9,122,249 | B2 | 9/2015 | Lyons et al. |
| 9,696,690 | B2 | 7/2017 | Nguyen et al. |
| 2003/0030595 | A1 | 2/2003 | Radley-Smith |
| 2005/0052852 | A1 | 3/2005 | Ono |
| 2005/0113081 | A1 | 5/2005 | Tushinsky et al. |
| 2005/0132290 | A1* | 6/2005 | Buchner ............... G06F 1/163 715/702 |
| 2005/0174302 | A1 | 8/2005 | Ishii |
| 2007/0075915 | A1 | 4/2007 | Cheon et al. |
| 2007/0279852 | A1 | 12/2007 | Daniel et al. |
| 2008/0001764 | A1 | 1/2008 | Douglas et al. |
| 2008/0318636 | A1 | 12/2008 | Kim |
| 2009/0104931 | A1 | 4/2009 | Chiang |
| 2009/0251419 | A1 | 10/2009 | Radely-Smith |
| 2009/0273560 | A1 | 11/2009 | Kalanithi et al. |
| 2010/0004037 | A1 | 1/2010 | Ozawa |
| 2010/0029327 | A1 | 2/2010 | Jee |
| 2010/0064536 | A1 | 3/2010 | Caskey et al. |
| 2010/0217667 | A1 | 8/2010 | Mo |
| 2010/0228691 | A1 | 9/2010 | Yang et al. |
| 2011/0059769 | A1 | 3/2011 | Brunolli |
| 2011/0102354 | A1 | 5/2011 | Fuyuno et al. |
| 2011/0157022 | A1 | 6/2011 | Goldburt |
| 2011/0193805 | A1 | 8/2011 | Park et al. |
| 2011/0291964 | A1 | 12/2011 | Chambers et al. |
| 2012/0021684 | A1 | 1/2012 | Schultz et al. |
| 2012/0075173 | A1 | 3/2012 | Ashbrook et al. |
| 2012/0242596 | A1 | 9/2012 | Sip |
| 2013/0044215 | A1 | 2/2013 | Rothkopf et al. |
| 2013/0173658 | A1* | 7/2013 | Adelman ............ G06K 19/0723 707/769 |
| 2013/0222270 | A1 | 8/2013 | Winkler et al. |
| 2013/0222271 | A1 | 8/2013 | Alberth et al. |
| 2013/0271350 | A1 | 10/2013 | Lyons |
| 2013/0271355 | A1 | 10/2013 | Lyons et al. |
| 2013/0271389 | A1 | 10/2013 | Lyons et al. |
| 2013/0271390 | A1 | 10/2013 | Lyons et al. |
| 2013/0271392 | A1 | 10/2013 | Lyons |
| 2013/0271495 | A1 | 10/2013 | Nguyen et al. |
| 2014/0047379 | A1 | 2/2014 | Urawaki et al. |
| 2014/0172548 | A1 | 6/2014 | Garlick |
| 2015/0185884 | A1* | 7/2015 | Magi ..................... G06F 3/014 345/173 |
| 2015/0258458 | A1 | 9/2015 | Zhang et al. |
| 2016/0239182 | A1 | 8/2016 | Eronen et al. |
| 2016/0266660 | A1 | 9/2016 | Eronen et al. |

FOREIGN PATENT DOCUMENTS

| | | |
|---|---|---|
| EP | 1 259 135 B1 | 9/2006 |
| EP | 1 754 424 A1 | 2/2007 |
| EP | 1 998 260 A1 | 12/2008 |
| EP | 2 154 662 A2 | 2/2010 |
| EP | 2 368 455 A1 | 9/2011 |
| EP | 2372984 | 10/2011 |
| EP | 2 474 168 A2 | 7/2012 |
| EP | 2 549 480 A1 | 1/2013 |
| GB | 2411552 A | 8/2005 |
| JP | 2001125722 | 5/2001 |
| KR | 20110067849 | 6/2011 |
| WO | WO 01/064070 A1 | 9/2001 |
| WO | WO 2011/029098 A2 | 3/2011 |
| WO | WO 2012/108668 A2 | 8/2012 |
| WO | WO 2014/202490 A1 | 12/2014 |
| WO | WO 2015/063361 A1 | 5/2015 |
| WO | WO 2015/063362 A1 | 5/2015 |

OTHER PUBLICATIONS

"Leaked Footage: Nokia's Facet smartwatch concept", Oct. 17, 2013, retrieved from the Internet: URL:https://www.youtube.com/watch?v=Bxn_N4vHqXQ, 1 page.

"Touch Screen Bracelet Tells You Weather and Reads Texys" by PSFK, Nov. 1, 2012, 3 pages.

Office Action for European Application No. 13 798 364.9 dated May 17, 2017, 8 pages.

Office Action for European Application No. 13 795 278.4 dated May 17, 2017, 10 pages.

Office Action for European Application No. 13 795 277.6 dated May 11, 2017, 8 pages.

Office Action for U.S. Appl. No. 15/030,748 dated Jun. 14, 2017.

International Search Report and Written Opinion received for corresponding Patent Cooperation Treaty Application No. PCT/FI2013/051017, dated Aug. 28, 2014, 14 pages.

International Search Report and Written Opinion for International Application No. PCT/FI2013/051016 dated Jul. 31, 2014, 16 pages.

International Search Report and Written Opinion for International Application No. PCT/FI2013/051014 dated Jul. 31, 2014, 13 pages.

Kien, D.T., *A Review of 3D Reconstruction From Video Sequences*, ISIS Technical Report Services, Draft Version 01 (2005) 35 pages.

Lyons, K. et al., *Facet: A Multi-Segment Wrist Worn System*, UIST'12, Proceedings of the Annual ACM Symposium on User Interface Software and Technology, Cambridge, Massachusetts, USA, Oct. 7, 2012, pp. 123-129

Ma, Y. et al., *An Invitation to 3-D Vision, From Images to Geometric Models*, Springer Science+Business Media, LLC (2004) 542 pages.

McNerney, T.S., *Tangible Programming Bricks: An approach to making programming accessible to everyone*, Thesis, Massachusetts Institute of Technology (Feb. 2000) 86 pages.

Merrill, D., *Toy Tiles That Talk To Each Other*, TED Talk, YouTube Video [online] [retrieved May 25, 2017] https://www.ted.com/talks/david_merrill_demos_siftables_the_smart_blocks>. (dated Feb. 2009) 8 pages.

Olberding, S. et al., *Augmented Forearm*, 20130307; 20130307-2013-0308, Mar. 7, 2013, pp. 9-12.

Wacharamanotham, C. et al., *The Interactive Bracelet: an Input Device for Bimanual Interactions*, MobileHCI 2010 (Sep. 2010), 4 pages.

The Interactive Bracelet: An input device for bimanual interaction [online] [retrieved Jul. 24, 2017]. Retrieved from the Internet: <URL: http://hci.rwth-aachen.de/materials/publications/wacharamanotham2010a.pdf>. 4 pages.

MIT Media Lab: Siftables—You Tube Video [online] [retrieved May 25, 2017]. <https://www.youtube.com/watch?v=vbwzBBHtNG1>. (dated Mar. 14, 2008) 2 pages.

MIT Media Lab: Siftables [online] [retrieved Jul. 24, 2017]. Retrieved from the Internet: <URL: https://www.youtube.com/watch?v=vbwzBBHtNGl>. (Published Mar. 14, 2008), 3 pages.

Smartwatchnews: "EmoPulse Smile, Best smartwatch so far", Jun. 10, 2013, Retrieved from the Internet: URL:https://www.youtube.com/glncowatch?v=LzPorA, 1 page.

Toy Tiles That Talk to Each Other [online] [retrieved Jul. 24, 2017]. Retrieved from the Internet: <URL:https://www.ted.com/talks/david_merrill_demos_siftables_the_smart_blocks>. (filmed Feb. 2009), 4 pages.

Office Action for U.S. Appl. No. 15/030,457 dated Sep. 14, 2017, 26 pages.

Office Action for U.S. Appl. No. 15/030,748 dated Dec. 1, 2017, 16 pages.

\* cited by examiner

METHOD AND APPARATUS FOR OPERATION DESIGNATION

RELATED APPLICATION

This application was originally filed as PCT Application No. PCT/US2013/047143 filed Jun. 21, 2013.

TECHNICAL FIELD

The present application relates generally to operation designation.

BACKGROUND

Many users have become dependent on electronic apparatuses to manage various aspects of their lives. For example, users have become accustomed to keeping at least one electronic apparatus with them for many different purposes, such as communication, finding information, navigation, rendering media, and/or the like. As users have become more reliant on electronic apparatuses throughout their daily lives, the manner in which users utilize their electronic apparatuses throughout the day has evolved. It may be desirable to provide a way for users to interact easier with their electronic apparatuses in ways that integrate well into their lives.

SUMMARY

Various aspects of examples of the invention are set out in the claims.

One or more embodiments may provide an apparatus, a computer readable medium, a non-transitory computer readable medium, a computer program product, and a method for receiving an indication of an input from a separate bead apparatus, determining that the separate bead apparatus is associated with a designated operation of a designated program, and performing the designated operation based, at least in part, on receipt of the indication of the input.

One or more embodiments may provide an apparatus, a computer readable medium, a computer program product, and a non-transitory computer readable medium having means for receiving an indication of an input from a separate bead apparatus, means for determining that the separate bead apparatus is associated with a designated operation of a designated program, and means for performing the designated operation based, at least in part, on receipt of the indication of the input.

In at least one example embodiment, the association between the separate bead apparatus and the designated operation of the designated program relates to the separate bead apparatus being allocated to the designated program.

In at least one example embodiment, the association between the separate bead apparatus and the designated operation of the designated program relates to the separate bead apparatus being allocated to the designated operation of the designated program.

In at least one example embodiment, the indication of the input is received from the separate bead apparatus by way of wireless communication.

One or more example embodiments further perform determining that the designated program is not running on the apparatus, and causing the designated program to run on the apparatus.

In at least one example embodiment, the designated program relates to at least one of a messaging program, a calendar program, a media player program, or a social networking program.

In at least one example embodiment, the designated operation relates to invoking a designated view of the designated program.

In at least one example embodiment, the designated operation relates to setting a value of a parameter of the designated program.

One or more example embodiments further perform determining that the input relates to rotation of the separate bead apparatus around a suspension axis of the separate bead apparatus, and causing at least one of a decrement of the value of the parameter in proportion to an amount of rotation of the separate bead apparatus, or an increment of the value of the parameter in proportion to an amount of rotation of the separate bead apparatus.

In at least one example embodiment, the separate bead apparatus comprises at least two outward facing surfaces, and at least one of the increment or the decrement is proportional to the outward facing surfaces and the amount of rotation.

In at least one example embodiment, the input is indicative of a touch input on a surface of the separate bead apparatus.

One or more example embodiments further perform receiving an indication of another input that is indicative of rotation of the separate bead apparatus around a suspension axis of the separate bead apparatus, and causing the separate bead apparatus to be associated with a different designated operation of the designated program.

One or more example embodiments further perform receiving another indication of another input that is indicative of a touch input on a surface of the separate bead apparatus, determining that the separate bead apparatus is associated with the different designated operation of the designated program, and performing the designated operation based, at least in part, on receipt of the indication of the input.

In at least one example embodiment, the input relates to rotation of the separate bead apparatus around a suspension axis of the separate bead apparatus.

One or more example embodiments further perform causing the separate bead apparatus to be associated with a different designated operation of the designated program.

In at least one example embodiment, the designated operation and the different designated operation are comprised in an ordered set of designated operations associated with the designated program.

In at least one example embodiment, the different designated operation is based, at least in part, on an amount of rotation of the separate bead apparatus.

One or more example embodiments further perform receiving an indication of a touch input that corresponds with an interface element of another program, causing designation of the other program and designation of another operation that is associated with the interface element such that the separate bead apparatus becomes associated with the designated other operation of the designated other program.

In at least one example embodiment, the causation of designation of the other program and the other operation is based, at least in part, on a determination that the touch input relates to the separate bead apparatus touching the apparatus.

In at least one example embodiment, the causation of designation of the other program and the other operation is predicated by the determination that the touch input relates to the separate bead apparatus touching the apparatus.

In at least one example embodiment, determination that the touch input relates to the separate bead apparatus touching the apparatus is based on tangible object recognition.

In at least one example embodiment, tangible object recognition comprises receiving an indication of a touch input from the separate bead apparatus, and determining that the touch input from the separate bead apparatus corresponds with the touch input.

In at least one example embodiment, the causation of designation of the other program and the other operation comprises sending an operation change directive to the separate bead apparatus, the operation change directive being indicative of the other program and indicative of the other operation.

One or more example embodiments further perform determining occurrence of an event associated with the designated operation, and causing rendering of an indication of the event on the separate bead apparatus.

In at least one example embodiment, causing rendering comprises sending information indicative of the event to the separate bead apparatus.

In at least one example embodiment, the event relates to at least one of receiving content associated with the operation, or occurrence of a milestone associated with the operation.

In at least one example embodiment, occurrence of a milestone relates to completion of, at least part of, the operation.

One or more embodiments may provide an apparatus, a computer readable medium, a non-transitory computer readable medium, a computer program product, and a method for receiving an indication of an input, determining that the apparatus is associated with a designated operation of a designated program of a separate apparatus, determining that the input is indicative of invocation of the designated operation; determining an operation invocation directive indicative of the designated operation, and sending the operation invocation directive to the separate apparatus.

One or more embodiments may provide an apparatus, a computer readable medium, a computer program product, and a non-transitory computer readable medium having means for receiving an indication of an input, means for determining that the apparatus is associated with a designated operation of a designated program of a separate apparatus, means for determining that the input is indicative of invocation of the designated operation, means for determining an operation invocation directive indicative of the designated operation, and means for sending the operation invocation directive to the separate apparatus.

In at least one example embodiment, the association between the apparatus and the designated operation of the designated program relates to the apparatus being allocated to the designated program.

In at least one example embodiment, the association between the apparatus and the designated operation of the designated program relates to the apparatus being allocated to the designated operation of the designated program.

In at least one example embodiment, the indication of the input sent to the separate apparatus by way of wireless communication.

One or more example embodiments further perform determining that the designated program is not running on the separate apparatus, and causing the designated program to run on the separate apparatus.

In at least one example embodiment, causing the designated program to run on the apparatus comprises sending a program invocation directive to the apparatus.

One or more example embodiments further perform receiving information indicative of run status of the designated program, wherein determination that the designated program is not running is based, at least in part, on the information indicative of run status.

In at least one example embodiment, the designated program relates to at least one of a messaging program, a calendar program, a media player program, or a social networking program.

In at least one example embodiment, the designated operation relates to invoking a designated view of the designated program.

In at least one example embodiment, the operation invocation directive comprises information indicative of the view.

In at least one example embodiment, the designated operation relates to setting a value of a parameter of the designated program.

In at least one example embodiment, the operation invocation directive comprises information indicative of the parameter.

In at least one example embodiment, the operation invocation directive comprises information indicative of at least one of a replacement value or a modification value.

One or more example embodiments further perform determining that the input relates to rotation of the apparatus around a suspension axis of the apparatus, and causing at least one of a decrement of the parameter in proportion to an amount of rotation of the apparatus, or an increment of the parameter in proportion to an amount of rotation of the apparatus.

In at least one example embodiment, causation of at least one of the decrement or the increment comprises determining the operation invocation directive to comprise an indication of at least one of the decrement or the increment.

In at least one example embodiment, the apparatus comprises at least two outward facing surfaces, and at least one of the increment or the decrement is proportional to the number of surfaces and the amount of rotation.

In at least one example embodiment, the input is indicative of a touch input related to a surface of the apparatus.

One or more example embodiments further perform receiving an indication of another input that is indicative of rotation of the apparatus around a suspension axis of the apparatus, and causing the apparatus to be associated with a different designated operation of the designated program.

One or more example embodiments further perform receiving another indication of another input that is indicative of a touch input on the surface of the apparatus, determining that the other input is indicative of invocation of the different designated operation, determining a different operation invocation directive indicative of the different designated operation, and sending the different operation invocation directive to the separate apparatus.

In at least one example embodiment, the input relates to rotation of the apparatus around a suspension axis of the apparatus.

One or more example embodiments further perform causing the apparatus to be associated with a different designated operation of the designated program.

In at least one example embodiment, the designated operation and the different designated operation are comprised in an ordered set of designated operations associated with the designated program.

In at least one example embodiment, the different designated operation is based, at least in part, on an amount of rotation of the apparatus.

In at least one example embodiment, the apparatus is a separate bead apparatus.

One or more example embodiments further perform receiving an indication of an operation change directive that identifies another designated operation, and causing association between input of the apparatus and the other designated operation.

One or more example embodiments further perform receiving an indication of a program change directive that identifies another designated program, and causing association between input of the apparatus and the other designated program.

In at least one example embodiment, the apparatus comprises an output device.

One or more example embodiments further perform receiving, from the separate apparatus, information indicative of an event associated with the designated operation, and causing rendering of the information indicative of the event by way of the output device.

In at least one example embodiment, the output device comprises a light, and the rendering comprises causing the light to become, at least temporarily, lit.

One or more example embodiments further perform receiving an indication of another input, and terminating rendering of the information based, at least in part, on the other input.

In at least one example embodiment, the designated program is associated with a first interface mode, and a second designated program is associated with a second interface mode.

One or more example embodiments further perform receiving an interface mode change directive, and causing the apparatus to be associated with the second designated program.

In at least one example embodiment, the interface mode change directive is received from a separate bead apparatus.

In at least one example embodiment, the interface mode change directive comprises information indicative of the second interface mode.

In at least one example embodiment, the separate apparatus is a separate bead apparatus, the designated program relates to a separate bead apparatus operational program, the designated operation relates to an interface mode change operation, and the operation invocation directive relates to an interface mode change directive.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
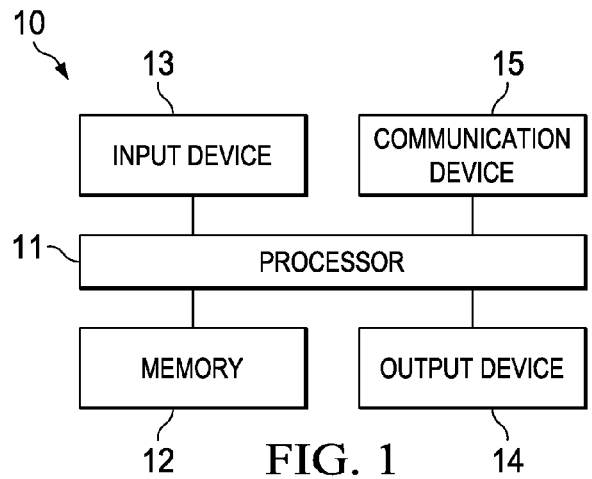
FIG. 1 is a block diagram showing an apparatus according to an example embodiment.

An embodiment of the invention and its potential advantages are understood by referring to FIGS. 1 through 9C of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
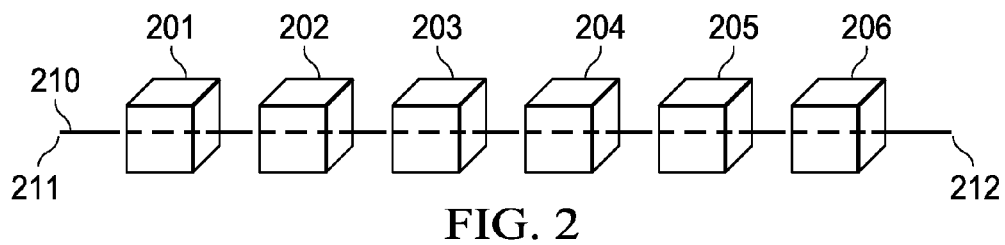
FIG. 2 is a diagram illustrating separate bead apparatuses according to at least one example embodiment.

FIG. 2 is a diagram illustrating separate bead apparatuses according to at least one example embodiment. The example of FIG. 2 is merely an example of separate bead apparatuses, and does not limit the scope of the claims. For example, number of apparatuses may vary, bead interconnection may vary, configuration of the bead apparatuses may vary, and/or the like.

The example of FIG. 2 illustrates bead apparatuses 201-206 mounted on strand 210. It can be seen that strand 210 comprises ends 211 and 212. In at least one example embodiment, a bead apparatus relates to an apparatus that comprises at least one input device, such as input device 14 of FIG. 1, and is configured to be mounted on a strand.

Ends 211 and 212 may be configured to provide for attachment to each other. For example, there may be one or more couplers at end 211 and/or end 212 such that end 211 may be coupled to end 212. In this manner, strand 210 may be configured to be a bracelet, a necklace, a belt, and/or the like, upon which one or more beads are mounted. In at least one example embodiment, the strand is an electronic apparatus. For example, the strand may be an apparatus that communicates with one or more bead apparatuses. For example, the strand may communicate with one or more bead apparatus, may provide for communication from one bead apparatus to another bead apparatus, and/or the like. For example, the strand may serve as a master apparatus that governs behavior of one or more bead apparatus mounted upon the strand. In another example, the strand performs no operations or communications regarding one or more bead apparatus. In such an example, the strand may be a non-electronic apparatus.

A bead apparatus may be configured to allow for a strand to pass through the bead apparatus. For example, there may be a cavity disposed through, at least part of the bead apparatus configured to allow a strand to pass through the cavity. In such an example, the bead may be rotatable about the cavity when the bead apparatus is mounted to the strand. In this manner, the cavity relates to a suspension axis of the bead apparatus around which the bead apparatus may rotate.

A bead apparatus may be configured to allow for attachment of a strand to one or more sides of the bead apparatus. For example, one or more surfaces of the bead apparatus may be configured to be coupled with a strand. In such an example, the bead apparatus may comprise a symmetrical coupling with a strand such that the strand may be coupled at opposite sides of the bead apparatus. In such an example, the coupling between the strand and the bead apparatus may allow the bead to be rotated between the strand couplings. In this manner, there may be a suspension axis of the bead apparatus that relates to a line between the strand couplings of bead apparatus, such that the beads apparatus may rotate around the suspension axis.

In at least one example embodiment, each bead apparatus is a separate bead apparatus such that each bead apparatus may be capable of operations that are independent of one or more other bead apparatuses. For example, a bead apparatus may receive an input, may communicate with a separate apparatus, and/or the like, without regard for one or more other bead apparatus. For example, each bead apparatus may be similar to apparatus 10 of FIG. 1. For example, the bead apparatus may comprise a communication device, such as communication device 15 of FIG. 1. The bead apparatus may utilize the communication device to communicate with one or more other bead apparatuses, with a strand that is an electronic apparatus, with a separate non-bead apparatus, and/or the like. In this manner, the bead apparatus may send information to one or more other apparatus, receive information from one or more other apparatus, and/or the like, by way of the communication device. A non-bead apparatus may relate to any electronic apparatus that is not a bead apparatus, such as a laptop, a mobile phone, a tablet, a desktop computer, a television, a light fixture, and/or the like. In this manner, the bead apparatus may be in communication with a separate apparatus by way of the communication device.

Even though the bead apparatuses of FIG. 2 relate to cubes, any configuration of bead may be desirable. In addition, even though all of the beads of the example of FIG. 2 are all similar configurations, configuration of different bead apparatuses may vary. For example, configuration of one or more beads mounted to a strand may differ from configuration of one or more other bead apparatuses. In at least one example embodiment, the bead apparatus comprises one or more outward facing surfaces. In at least one example embodiment, an outward facing surface relates to a surface of the bead apparatus that faces outward from a suspension axis of the bead apparatus. For example, bead apparatus 201 may comprise four outward facing surfaces. The two surfaces penetrated by strand 210 may relate to two non-outward facing surfaces, and the other four other surfaces relate to outward facing surfaces. In at least one example embodiment, a bead apparatus comprises at least two outward facing surfaces. In such an example, there may exist at least two stable rotational positions. In at least one example embodiment, a stable rotational position relates to a position at which a surface of the bead apparatus aligns with at least part of the surface of a user. For example, if a strand forms a bracelet, a stable rotational position of a bead apparatus mounted to the strand may relate to a surface of the bead apparatus aligning with the wrist of the user. The four outward facing surfaces of bead apparatus 201 may provide for four stable rotational positions.

In at least one example embodiment, a bead apparatus comprises one or more output devices, such as output device 14. For example, the bead apparatus may comprise one or more lights, speakers, displays, and or the like.

Figure 3A:
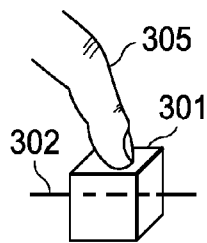
FIGS. 3A-3C are diagrams illustrating input associated with a bead apparatus according to at least one example embodiment.
Figure 3B:
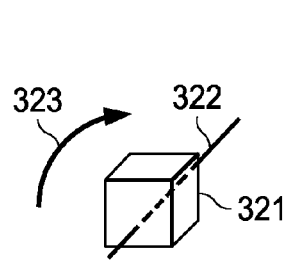
Figure 3C:
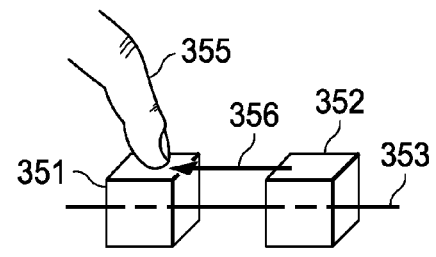

FIGS. 3A-3C are diagrams illustrating input associated with a bead apparatus according to at least one example embodiment. The examples of FIGS. 3A-3C are merely examples of input associated with a bead apparatus, and do not limit the scope of the claims. For example, type of input may vary, configuration of the bead apparatus may vary, and/or the like.

In at least one example embodiment, a bead apparatus receives an indication of an input. The bead apparatus may receive the indication of the input from an input device, such as input device 13 of FIG. 1, from a separate apparatus, and/or the like. The indication may relate to information that indicates occurrence of the input, describes at least one characteristic of the input, logistical information associated with the input, and/or the like. For example, the indication of the input may comprise information indicating a direction of the input, a position associated with the input, an input device associated with the input, time information associated with receipt of the input, and/or the like.

FIG. 3A is a diagram illustrating a touch input associated with a bead apparatus according to at least one example embodiment. The example of FIG. 3A illustrates bead apparatus 301 mounted on strand 302. In the example of FIG. 3A, finger 305 is performing a touch input on bead apparatus 301. A touch input may relate to an input associated with contact on the surface of the bead apparatus, close proximity to the apparatus, and/or the like. It should be understood that there are many available touch sensors and touch detection methodologies, and that many touch sensor and touch input methodologies will emerge in the future, and that the scope of the claims are not limited in any way by touch sensors and/or touch input methodologies.

In at least one example embodiment, the touch input may be related to a surface of the apparatus. For example, the example of FIG. 3A illustrates a touch input related to the surface of bead apparatus 301 that is currently upward from strand 302. In at least one example embodiment, the indication of the input identifies a surface related to the touch input. For example, the indication of the input may identify the surface based on a relative identification, such as a descriptor relating to the surface in relation to the user, in relation to a surface of the user upon which the bead apparatus is being worn, a surface of the bead apparatus in relation to a strand, and/or the like. In another example, the indication of the input may identify the surface in relation to a non-relative identification. For example, the indication of the input may identify the surface without regard for the interrelationship between the surface and any point of reference unassociated with the bead apparatus.

FIG. 3B is a diagram illustrating an input indicative of rotation associated with a bead apparatus according to at least one example embodiment. In the example of FIG. 3B, force 323 is acting upon bead apparatus 321 to cause rotation of bead apparatus 322. In at least one example embodiment, the rotation relates to rotation around a suspension axis of the bead apparatus, such as around a strand to which the bead apparatus is mounted.

The bead apparatus may determine an input indicative of rotation by way of a sensor, such as a motion sensor, a position sensor, and/or the like. For example, the apparatus may utilize a motion sensor, such as an accelerometer, a gyroscope, etc. to determine rotation of the apparatus. In another example, the apparatus may determine rotation by way of measure movement of the bead apparatus relative to the strand. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

FIG. 3C is a diagram illustrating an input associated with a plurality of bead apparatuses according to at least one example embodiment. It can be seen that bead apparatuses 351 are adjacent to each other as mounted on strand 353. It can be seen that finger 355 is performing touch input 356, which is performed upon both bead apparatus 351 and bead apparatus 352. In at least one example embodiment, bead apparatus 352 receives information indicative of touch input 356. In at least one example embodiment, apparatus 351 receives information indicative of input 356 in relation to bead apparatus 352. For example, bead apparatus 352 may provide information indicative of touch input 356 in relation bead apparatus 352. In this manner, apparatus 351 may determine that touch input 356 spans across bead apparatus 352 and 351. In at least one example embodiment, a bead apparatus performs an operation in relation to a touch input associated with the bead apparatus and performs a different operation in relation to a touch input that spans the bead apparatus and another bead apparatus. For example, the bead apparatus may send information indicative of a touch input associated with the bead apparatus to a separate apparatus, and may perform an operation in conjunction with the other bead apparatus in relation to a touch input that spans the bead apparatus and the other bead apparatus.

Figure 4A:
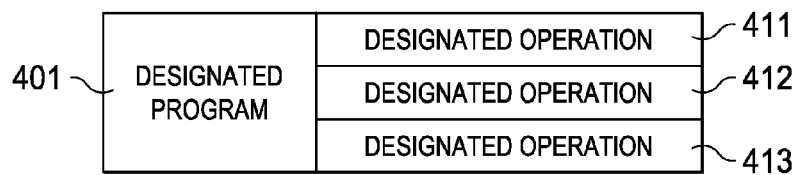
FIGS. 4A-4B are diagrams illustrating designated operations associated with inputs according to at least one example embodiment.
Figure 4B:
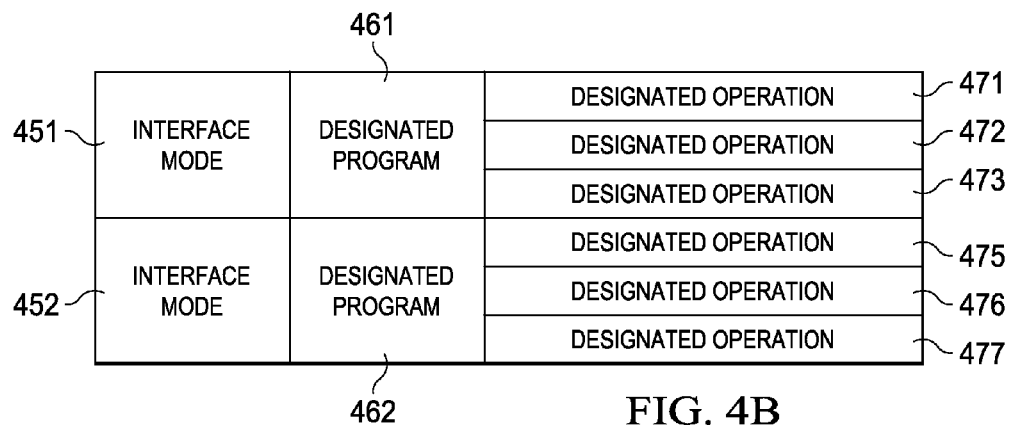

FIGS. 4A-4B are diagrams illustrating designated operations associated with inputs according to at least one example embodiment. The examples of FIGS. 4A-4B are merely examples of designated operations associated with inputs, and do not limit the scope of the claims. For example, number of designated operations may vary, interrelationships between designated operations and designated programs may vary, interrelationships between interface modes and designated operation may vary, and/or the like.

As user's interaction with electronic apparatuses evolve, it may be desirable to provide users with a way to particularize certain interactions that the user performs on an electronic apparatus in a way that allows the user to quickly identify an input with an operation on the electronic apparatus, allows the user to quickly perform the input, and/or the like. In some circumstances, it may be desirable for the user to perform the input on an apparatus that is separate from the apparatus that performs the operation. For example, the user may desire a simple interface that may not necessarily provide the breadth of operations that may be available on the apparatus, but may be very simple to identify and perform input upon. For example, it may be desirable for a user to utilize a separate bead apparatus to invoke an operation on an apparatus.

For example, the user may desire to have a bead apparatus that is dedicated to a certain program, a certain operation of a program, and/or the like. In such an example, the user may be able to rely on the bead apparatus for invocation of the program, invocation of the operation, and/or the like, on the apparatus. For example, the user may desire to open an email message on the apparatus by way of performing an input on the bead apparatus.

There are many programs that a user may desire to associate with a bead apparatus. For example, the user may desire to associate the bead apparatus with a messaging program, a calendar program, a media player program, or a social networking program. For example, the user may desire input on the bead apparatus to cause the apparatus to invoke an operation associated with such programs. For example, the user may desire a touch input on the bead apparatus to cause a messaging program to create a new message to be composed, to cause information to be posted regarding a social networking account, to control rendering of media, for example, pausing the media, skipping media, etc., to cause a browser to return to a previous page, to make a routing request to a navigation program, and/or the like.

In at least one example embodiment, the operation relates to invoking a designated view of the designated program. For example, the program may utilize a plurality of views for providing information to a user, for receiving information from a user, and/or the like. For example, a messaging program may provide a message composition view, which allows a user to view a composed message, to provide input for composing a message, and/or the like.

In at least one example embodiment, the operation relates to setting a value of a parameter of the designated program. The parameter may relate to a volume setting, a position in a list, or any parameter which may be incremented or decremented. Setting of the value may relate to changing an existing value, causing the parameter to be set to a predetermined value, and/or the like. For example, the setting the value may comprise dictating a value to be assigned to the parameter. For example, the user may desire that a touch input related to a bead apparatus causes a parameter to be set to a predetermined value.

In another example embodiment, a user may desire that an input relating to rotation of the bead apparatus, similar as described regarding FIG. 3B, causes decrement of the parameter, increment of the parameter, and/or the like. For example the apparatus may determine that the input relates to rotation of the separate bead apparatus around a suspension axis of the separate bead apparatus. The apparatus may cause at least one of a decrement of the value of the parameter in proportion to an amount of rotation of the separate bead apparatus, or an increment of the value of the parameter in proportion to an amount of rotation of the separate bead apparatus. For example, the amount the parameter is incremented or decremented proportional to the outward facing surfaces and the amount of rotation. For example, the increment may be based on the number of times a different outward facing surface becomes aligned to face the body of the user.

In some circumstances, the user may prefer to perform input associated with a bead apparatus to cause performance of an operation on the apparatus in order to simplify invocation of the operation. For example, invocation of the operation directly on the apparatus may be inconvenient for the user, unsafe for the user, socially unacceptable for the user to perform, and/or the like. For example, the apparatus may be a head mounted display, and the user may desire to invoke an operation on the head mounted display by way of a bead apparatus instead of performing an input on the head mounted display. In another example, the user may desire to discretely perform an input to respond to a message from the user's mobile phone while carrying on a conversation with a person at a party. In such an example the user may desire to tap a bead apparatus on a bracelet to cause the message to be sent, instead of interrupting the conversation by retrieving the mobile phone and invoking the sending of the message.

In at least one example embodiment, an association exists between a bead apparatus and an operation of a program of another apparatus. For example, the apparatus may designate a program to which the bead apparatus is associated, an operation of the program to which the bead apparatus is associated, and/or the like. For example, the apparatus may designate an operation of a program to be associated with a bead apparatus. In another example, the bead apparatus may designate a program, of the apparatus, to which the bead apparatus is associated, an operation of the program, of the apparatus, to which the bead apparatus is associated, and/or the like. For example, the bead apparatus may designate an operation of a program of the apparatus to be associated with a bead apparatus.

In at least one example embodiment, a designated program relates to a program to which input on the bead apparatus will be applied. For example, an input on a bead apparatus associated with a designated program may cause an operation to be performed on the designated program of the apparatus. In such an example, the association with the designated program may cause preclusion of an operation from being performed on a non-designated program of the apparatus. For example, an input associated with the bead apparatus associated with the designated program may cause performance of an operation of the designated program and be precluded from causing performance of any operation of any non-designated program. In this manner, association between the bead apparatus and the designated program may relate to limiting operations performed based on input related to the bead apparatus to the designated program. Such limitation may exclude performance of operations of non-designated programs based on input related to the bead apparatus. In this manner, the association between the separate bead apparatus and the designated operation of the designated program relates to the separate bead apparatus being allocated to the designated program.

In at least one example embodiment, a designated operation relates to an operation to which input on the bead apparatus will be applied. For example, an input on a bead apparatus associated with a designated operation may cause the designated operation to be performed on the designated program of the apparatus. In such an example, the association with the designated program may cause preclusion of a non-designated operation from being performed on the designated program of the apparatus. For example, an input related to the bead apparatus associated with the designated operation may cause performance of the designated operation of the dedicated program and be precluded from causing performance of any non-designated operation of the designated program. In this manner, association between the bead apparatus and the designated operation may relate to limiting operations performed based on input related to the bead apparatus to the designated operation. Such limitation may exclude performance of non-designated operations of designated programs based on input related to the bead apparatus. In this manner, the association between the separate bead apparatus and the designated operation of the designated program relates to the separate bead apparatus being allocated to the designated operation of the designated program.

In at least one example embodiment, the apparatus and/or the bead apparatus may store information indicative of the association between the designated operation, the designated program, and the bead apparatus. For example, the apparatus and/or the bead apparatus may utilize a data structure that identifies the designated program, the designated operation, the apparatus, the bead apparatus, and/or the like.

In at least one example embodiment, the apparatus associates the bead apparatus with the designated operation of the dedicated program. For example, the bead apparatus may be unaware of any association between itself and the designated program, the designated operation and/or the like. In such an example, the bead apparatus may be unaware of existence of the designated program, the designated operation, and/or the like. In such an example, the apparatus may receive an indication of an input related to the bead apparatus and determine that the bead apparatus is associated with a designated operation of a designated program. Such determination may be based, at least in part, on stored information comprised by the apparatus. The apparatus may perform the designated operation based, at least in part, on receipt of the indication of the input. For example, the apparatus may predicate performance of the designated operation based on the indication of the input on determination that the bead apparatus is associated with the designated operation of the designated program.

In some circumstances, the apparatus may receive an indication of an input from a bead apparatus that is associated with a designated program that is not running. For example, the designated program running may relate to the designated program being in an active process, in an active state, loaded in memory, and/or the like. In such circumstances, the apparatus may cause the designated program to run on the apparatus based, at least on part, on the indication of the input. For example, the apparatus may cause the designated program to run before causing the designated operation of the designated program to be performed.

In at least one example embodiment, the bead apparatus associates itself with the designated operation of the dedicated program of the apparatus. For example, the apparatus may be unaware of any association between the bead apparatus and the designated program, the designated operation and/or the like. In such an example, the apparatus may receive an operation invocation directive from the bead apparatus and cause performance of the operation based, at least in part on the operation invocation directive. In at least one example embodiment, the operation invocation directive identifies the designated operation and the designated program, such that the apparatus may perform the designated operation of the designated program based, at least in part, on the operation invocation directive. For example, the operation may relate to invocation of a view of the designated program, and the operation invocation directive may comprise information indicative of the view. In another example, the operation may relate to setting a value of a parameter, and the operation invocation directive may comprise information indicative of the parameter. In such an example, the operation invocation directive may comprise information indicative of a replacement value, a modification value, and/or the like. For example, the bead apparatus may cause decrement or increment of a parameter by way of determining the operation invocation directive to comprise an indication of the decrement or the increment.

In at least one example embodiment, the bead apparatus receives an indication of an input and determines that the bead apparatus is associated with a designated operation of a designated program of the apparatus. Such determination may be based, at least in part, on stored information comprised by the bead apparatus. In at least one example embodiment, the bead apparatus determines that the input is indicative of invocation of the designated operation. For example, there may be a specified input, such as a specified touch input, a specified rotation input, and/or the like for invocation of the designated operation. The bead apparatus may determine an operation invocation directive indicative of the designated operation and send the operation invocation directive to the apparatus to cause the apparatus to perform the designated operation. For example, the bead apparatus may predicate determination of the operation invocation directive on determination that the bead apparatus is associated with the designated operation of the designated program.

In some circumstances, the designated program may not be running on the apparatus. In such circumstances, the bead apparatus may cause the designated program to run on the apparatus based, at least on part, on the indication of the input. For example, the bead apparatus may cause the designated program to run before causing the designated operation of the designated program to be performed. In at least one example embodiment, causing the designated program to run on the apparatus comprises sending a program invocation directive to the apparatus. In at least one example embodiment, the program invocation directive identifies the program such that, upon receiving the program invocation directive, the apparatus causes the designated program to run.

In at least one example embodiment, the bead apparatus predicates sending of the program invocation directive on determination that the program is not running on the apparatus. For example, the bead apparatus may receive information indicative of run status of the designated program. For example, the apparatus may send information to the bead apparatus indicative of run status of the program, the bead apparatus may request run status information from the apparatus, and/or the like.

In at least one example embodiment, apparatus and/or the bead apparatus comprise an ordered set of designated operations associated with a designated program. In such an example, the apparatus, and or the bead apparatus may cause the bead apparatus to become associated with a different designated operation comprised in the ordered set. The ordered set may relate to any data structure, such as a table, a linked list, an array, and/or the like.

FIG. 4A is a diagram illustrating designated operations that may be associated with inputs according to at least one example embodiment. The example of FIG. 4A illustrates that designated operations 411-413 may be associated with a bead apparatus in relation to designated program 401. For example the bead apparatus may be associated with designated program 401 and designated operation 412.

In at least one example embodiment, the apparatus and/or the bead apparatus may cause the bead apparatus to be associated with a different designated operation of the designated program. For example, a rotational input of the bead apparatus may cause a change of the designated operation. For example, the bead apparatus may be associated with designated operation 412 of designated program 401. In such an example, the bead apparatus may become associated with designated operation 413 based on a rotation input of the bead apparatus, such as a bead apparatus associated with an increment. In a similar example, the bead apparatus may become associated with designated operation 411 based on a rotation input of the bead apparatus, such as a bead apparatus associated with a decrement. Even though the example of FIG. 4A illustrates an ordered set of designated operations associated with a program, there may be a single designated operation associated with a designated program.

FIG. 4B is a diagram illustrating designated operations associated with inputs according to at least one example embodiment. In some circumstances, it may be desirable to allow a user to transition between interface modes associated with a bead apparatus. For example, the user may desire to transition between a work interface mode and a personal interface mode. In such an example the work interface mode may relate to programs and operations that the user interfaces with regarding work matters, and the personal interface mode may relate to programs and operations that the user interfaces with regarding personal matters. In such circumstances, it may be desirable for the association between the bead apparatus and the designated program and/or the designated operation to be based, at least in part, on an ordered set that relates to an interface mode. For example, there may be a plurality of designated programs, and/or designated operations that correspond to an interface mode. Such an ordered set may cause change of designated program and/or designated operation based, at least in part, on a change of interface mode. For example, if the designated program is associated with an interface mode, and a different designated program is associated with a different interface mode, a change from the interface mode to the different interface mode may cause a change from the designated program to the different designated program.

In the example of FIG. 4B interface mode 451 corresponds with designated program 461 and an ordered set of designated operations 471-473, and interface mode 452 corresponds with designated program 462 and an ordered set of designated operations 475-477. Even though the example of FIG. 4B illustrates an ordered set of designated operations associated with a program, there may be a single designated operation associated with a designated program.

Figure 5A:
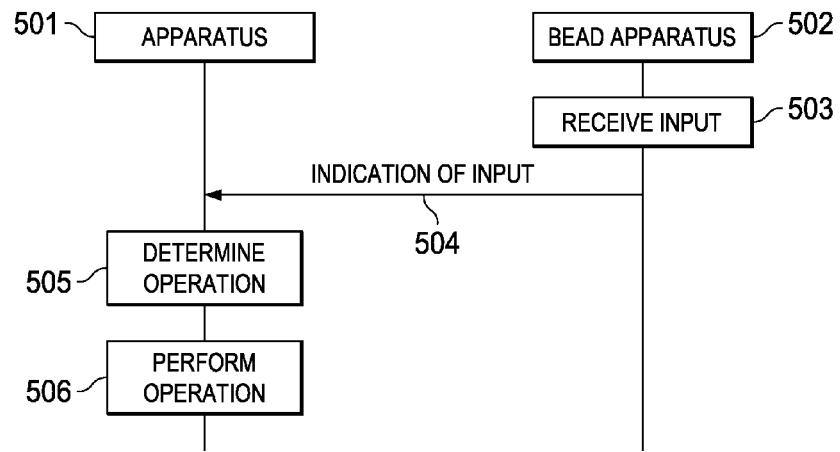
FIGS. 5A-5D are diagrams illustrating activities associated with performance of a designated operation according to at least one example embodiment.

FIG. 5A is an interaction diagram illustrating interaction associated performance of a designated operation according to at least one example embodiment. The example of FIG. 5A is merely an example of interaction associated with performance of a designated operation, and does not limit the scope of the claims. For example, communications may vary, order of communications may vary, apparatuses may vary, and/or the like.

The example of FIG. 5A may relate to an example of the apparatus associating a designated operation of a designated program with a separate bead apparatus. The bead apparatus may be considered separate from the apparatus, for at least, the reason that the bead apparatus is distinct from the apparatus.

The example of FIG. 5A illustrates interaction between apparatus 501 and bead apparatus 502 according to at least one example embodiment. In the example of FIG. 5A, bead apparatus 502 receives an indication of an input at block 503. The receipt, the indication, and the input may be similar as described regarding FIGS. 3A-3C. At interaction 504, bead apparatus 502 sends an indication of the input to apparatus 501. Thus, apparatus 501 receives an indication of the input from the bead apparatus by way of interaction 504.

At block 505, apparatus 501 determines that the separate bead apparatus is associated with a designated operation of a designated program. The determination, the association, the designated operation, and the designated program may be similar as described regarding FIGS. 4A-4B.

At block 506, apparatus 501 performs the designated operation based, at least in part, on receipt of the indication of the input. The performance may be similar as described regarding FIGS. 4A-4B. Performance of the designated operation may comprise determining that the designated program is not running on the apparatus, and causing the designated program to run on the apparatus. The determination, the running, and the causation of running may be similar as described regarding FIGS. 4A-4B.

Figure 5B:
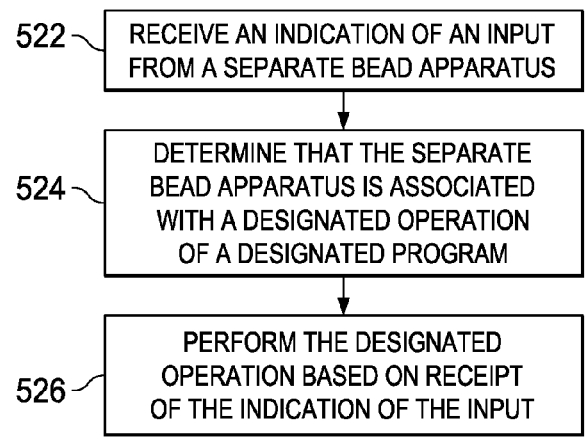

FIG. 5B is a flow diagram illustrating activities associated with performance of a designated operation according to at least one example embodiment. In at least one example embodiment, there is a set of operations that corresponds with the activities of FIG. 5B. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5B.

At block 522, the apparatus receives an indication of an input from a separate bead apparatus. The receipt, the indication, the bead apparatus, and the input may be similar as described regarding FIG. 2 and FIGS. 3A-3C.

At block 524, the apparatus determines that the separate bead apparatus is associated with a designated operation of a designated program. The determination, the association, the designated operation, and the designated program may be similar as described regarding FIGS. 4A-4B.

At block 526, the apparatus performs the designated operation based, at least in part, on receipt of the indication of the input. The performance may be similar as described regarding FIGS. 4A-4B. Performance of the designated operation may comprise determining that the designated program is not running on the apparatus, and causing the designated program to run on the apparatus. The determination, the running, and the causation of running may be similar as described regarding FIGS. 4A-4B.

Figure 5C:
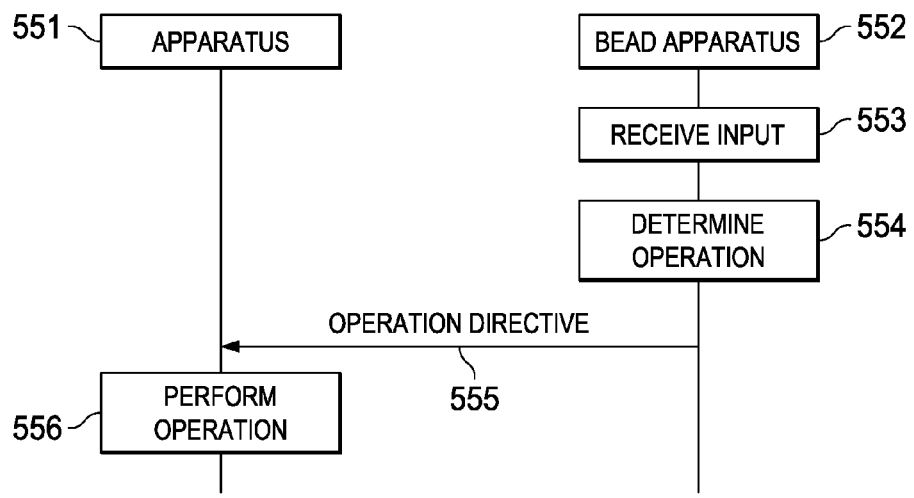

FIG. 5C is an interaction diagram illustrating interaction associated performance of a designated operation according to at least one example embodiment. The example of FIG. 5C is merely an example of interaction associated with performance of a designated operation, and does not limit the scope of the claims. For example, communications may vary, order of communications may vary, apparatuses may vary, and/or the like.

The example of FIG. 5C may relate to an example of the bead apparatus associating a designated operation of a designated program of a separate apparatus with itself. The apparatus may be considered separate from the bead apparatus, for at least, the reason that the bead apparatus is distinct from the apparatus.

The example of FIG. 5C illustrates interaction between apparatus 551 and bead apparatus 552 according to at least one example embodiment. In the example of FIG. 5C, bead apparatus 552 receives an indication of an input at block 553. The receipt, the indication, and the input may be similar as described regarding FIGS. 3A-3C.

At block 554, bead apparatus 552 determines a designated operation associated with the input. The determination and the designated operation may be similar as described regarding FIGS. 4A-4B. The determination of the designated operation may comprise determining that the apparatus is associated with a designated operation of a designated program of apparatus 551. The determination, the association, and the designated operation, may be similar as described regarding FIGS. 4A-4B. The determination of the designated operation may comprise determining that the input is indicative of invocation of the designated operation. The determination may be similar as described regarding FIGS. 4A-4B.

At interaction 555, bead apparatus 552 sends an operation invocation directive to apparatus 551. The sending and the operation invocation directive may be similar as described regarding FIGS. 4A-4B. Sending the operation invocation directive may comprise determining an operation invocation directive indicative of the designated operation. The determination may be similar as described regarding FIGS. 4A-4B. The sending of the operation invocation directive may comprise causing the designated program to run on the apparatus. The causation of running may be similar as described regarding FIGS. 4A-4B.

At block 556, apparatus 551 performs the designated operation based, at least in part, on the operation invocation directive. The performance of the operation may be similar as described regarding FIGS. 4A-4B.

Figure 5D:
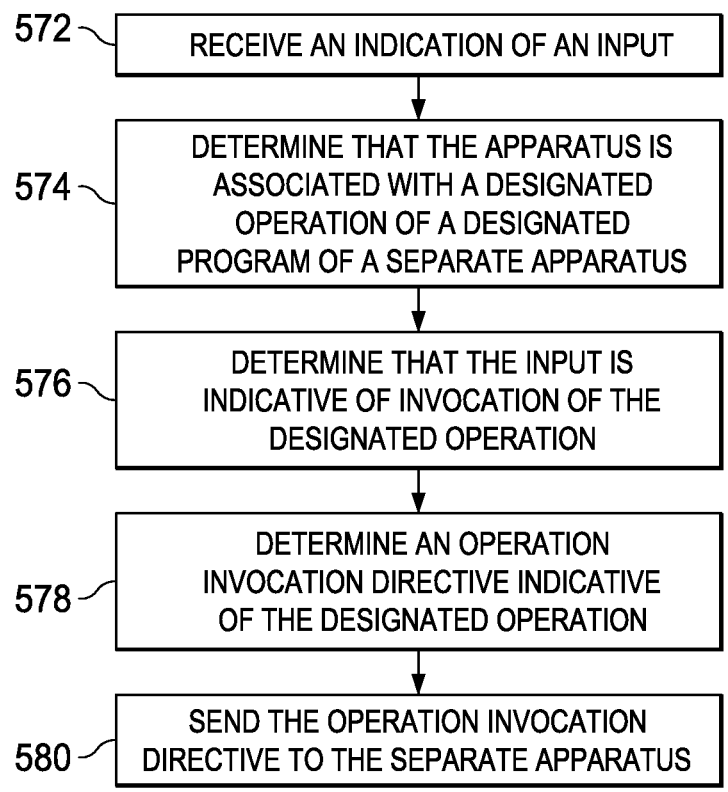

FIG. 5D is a flow diagram illustrating activities associated with performance of a designated operation according to at least one example embodiment. In at least one example embodiment, there is a set of operations that corresponds with the activities of FIG. 5D. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5D.

The example of FIG. 5D may relate to an example of the bead apparatus associating a designated operation of a designated program of a separate apparatus with itself. From the perspective of the bead apparatus, the bead apparatus may be referred to as the apparatus. In this manner, any apparatus that is distinct from the bead apparatus may be considered to be a separate apparatus.

At block 572, the apparatus receives an indication of an input. The receipt, the indication, the bead apparatus, and the input may be similar as described regarding FIG. 2 and FIGS. 3A-3C.

At block 574, the apparatus determines that the apparatus is associated with a designated operation of a designated program of a separate apparatus. The determination, the association, the designated operation, may be similar as described regarding FIGS. 4A-4B.

At block 576, the apparatus determines that the input is indicative of invocation of the designated operation. The determination may be similar as described regarding FIGS. 4A-4B.

At block 578, the apparatus determines an operation invocation directive indicative of the designated operation. The determination may be similar as described regarding FIGS. 4A-4B.

At block 580, the apparatus sends the operation invocation directive to the separate apparatus. The sending and the operation invocation directive may be similar as described regarding FIGS. 4A-4B. The sending of the operation invocation directive may comprise causing the designated program to run on the apparatus. The causation of running may be similar as described regarding FIGS. 4A-4B.

Figure 6A:
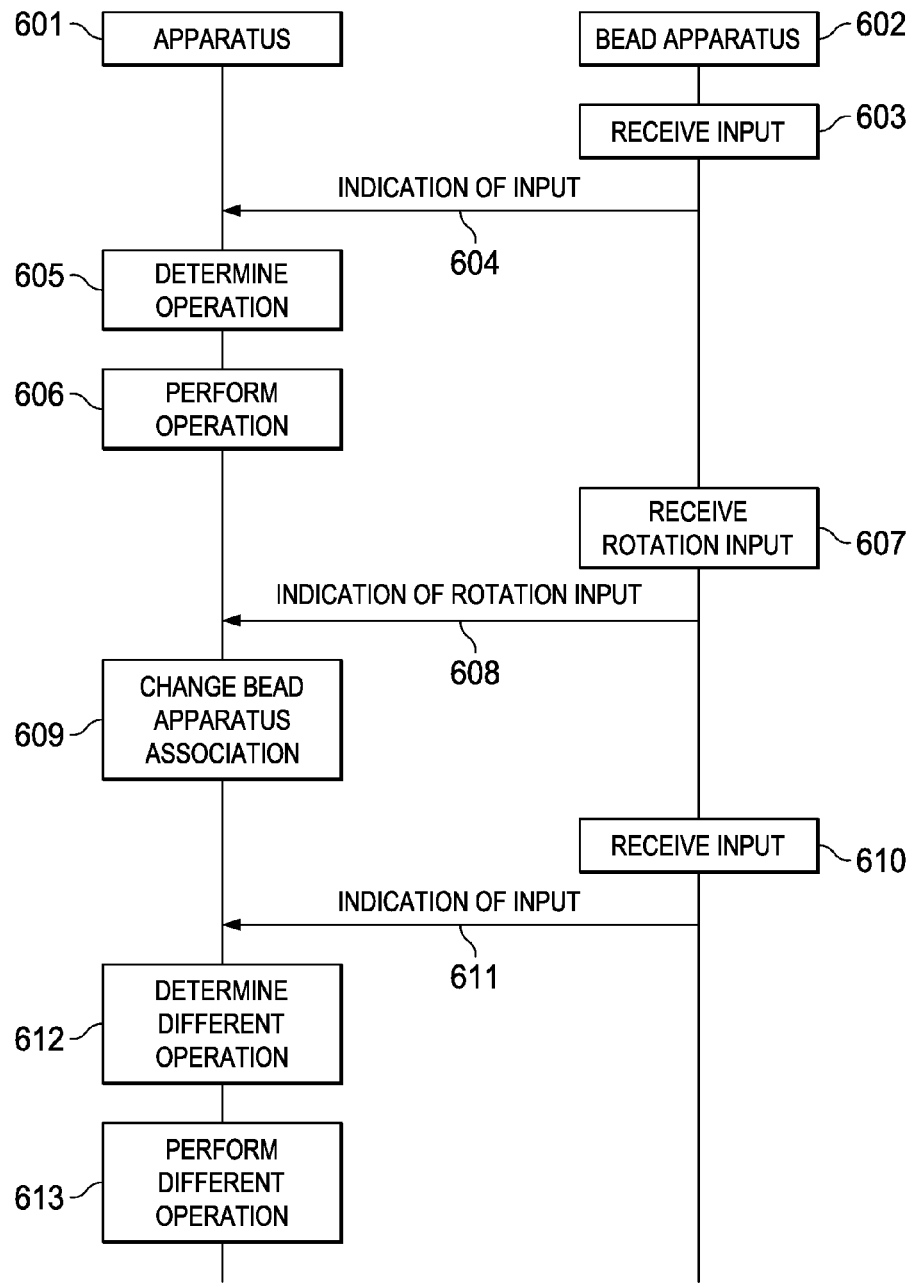
FIGS. 6A-6D are diagrams illustrating activities associated with performance of a designated operation according to at least one example embodiment.

FIG. 6A is an interaction diagram illustrating interaction associated performance of a designated operation according to at least one example embodiment. The example of FIG. 6A is merely an example of interaction associated with performance of a designated operation, and does not limit the scope of the claims. For example, communications may vary, order of communications may vary, apparatuses may vary, and/or the like.

In some circumstances, it may be desirable to change the designated operation associated with a bead apparatus. For example, it may be desirable to change the bead apparatus association with a designated pause operation for a media player program to a designated skip-ahead operation for the media player program. In this manner, the user may be able to modify the designated operation associated with the bead apparatus as the needs of the user change.

It may be desirable to provide a quick, simple, and intuitive way for the user to change the designated operation associated with the bead apparatus. For example, the user may find it quick, simple, and intuitive to change the designated operation associated with a bead apparatus by performing a rotation input on the bead apparatus. In this manner, the user may readily identify the change of the surface facing away from the surface upon which the bead apparatus is worn with a change in the designated operation with which the bead apparatus is associated.

The example of FIG. 6A may relate to an example of the apparatus associating a designated operation of a designated program with a separate bead apparatus. The bead apparatus may be considered separate from the apparatus, for at least, the reason that the bead apparatus is distinct from the apparatus.

In at least one example embodiment, the apparatus receives an indication of input that is indicative of rotation of the separate bead apparatus around a suspension axis of the separate bead apparatus. The apparatus may cause the separate bead apparatus to be associated with a different designated operation of the designated program, based, at least in part on the input. In at least one example embodiment, an input that is not indicative of rotation of the separate bead apparatus, such as a touch input, may cause performance of the different designated operation. In at least one example embodiment, the designated operation and the different designated operation are comprised in an ordered set of designated operations, such as the example of FIG. 4A, associated with the designated program. In at least one example embodiment, the different designated operation is based, at least in part, on an amount of rotation of the separate bead apparatus. For example, the amount of rotation may cause the apparatus to associate a different designated operation that is adjacent to the designated operation in an ordered set of designated operations, that is further away than adjacent from the designated operation in an ordered set of designated operations, and/or the like.

The example of FIG. 6A illustrates interaction between apparatus 601 and bead apparatus 602 according to at least one example embodiment. In the example of FIG. 6A, bead apparatus 602 receives an indication of an input at block 603, similarly as described regarding block 503 of FIG. 5A. At interaction 604, bead apparatus 603 sends an indication of the input to apparatus 601, similarly as described regarding interaction 504 of FIG. 5A. Thus, apparatus 601 receives an indication of the input from the bead apparatus by way of interaction 604. At block 605, apparatus 601 determines that the separate bead apparatus is associated with a designated operation of a designated program, similarly as described regarding block 505 of FIG. 5A. At block 606, apparatus 601 performs the designated operation based, at least in part, on receipt of the indication of the input, similarly as described regarding block 506 of FIG. 5A.

At block 607, bead apparatus 602 receives an indication of an input indicative of rotation of the bead apparatus around a suspension axis of the bead apparatus. The receipt, the indication of input, the rotation, and the axis may be similar as described regarding FIG. 2, and FIGS. 3A-3C. At interaction 608, bead apparatus 602 sends an indication of the input indicative of rotation to apparatus 601. Thus, apparatus 601 receives an indication of the input from the bead apparatus by way of interaction 608. At block 609, apparatus 601 causes association between the bead apparatus and the designated operation to change to a different designated operation.

In the example of FIG. 6A, bead apparatus 602 receives an indication of another input at block 610. The receipt, the indication, and the other input may be similar as described regarding FIGS. 3A-3C. At interaction 611, bead apparatus 602 sends an indication of the other input to apparatus 601. Thus, apparatus 601 receives an indication of the other input from the bead apparatus by way of interaction 611.

At block 612, apparatus 601 determines that bead apparatus 602 is associated with another designated operation of the designated program. The determination, the association, the designated operation, and the designated program may be similar as described regarding FIGS. 4A-4B.

At block 613, apparatus 601 performs the other designated operation based, at least in part, on receipt of the indication of the other input. The performance may be similar as described regarding FIGS. 4A-4B. Performance of the other designated operation may comprise determining that the designated program is not running on the apparatus, and causing the designated program to run on the apparatus. The determination, the running, and the causation of running may be similar as described regarding FIGS. 4A-4B.

Figure 6B:
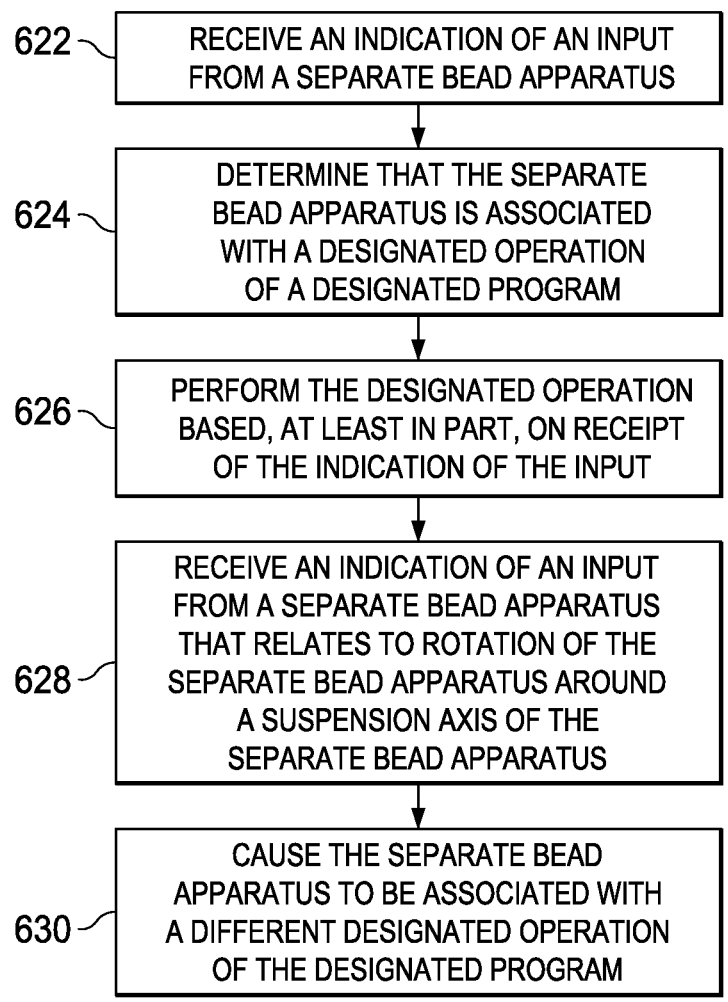

FIG. 6B is a flow diagram illustrating activities associated with performance of a designated operation according to at least one example embodiment. In at least one example embodiment, there is a set of operations that corresponds with the activities of FIG. 6B. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6B.

At block 622, the apparatus receives an indication of an input from a separate bead apparatus, similarly as described regarding block 522 of FIG. 5B. At block 624, the apparatus determines that the separate bead apparatus is associated with a designated operation of a designated program, similarly as described regarding block 524 of FIG. 5B. At block 626, the apparatus performs the designated operation based, at least in part, on receipt of the indication of the input, similarly as described regarding block 526 of FIG. 5B.

At block 628, the apparatus receives an indication of another input that is indicative of rotation of the separate bead apparatus around a suspension axis of the separate bead apparatus. At block 630, the apparatus causes the separate bead apparatus to be associated with a different designated operation of the designated program.

Figure 6C:
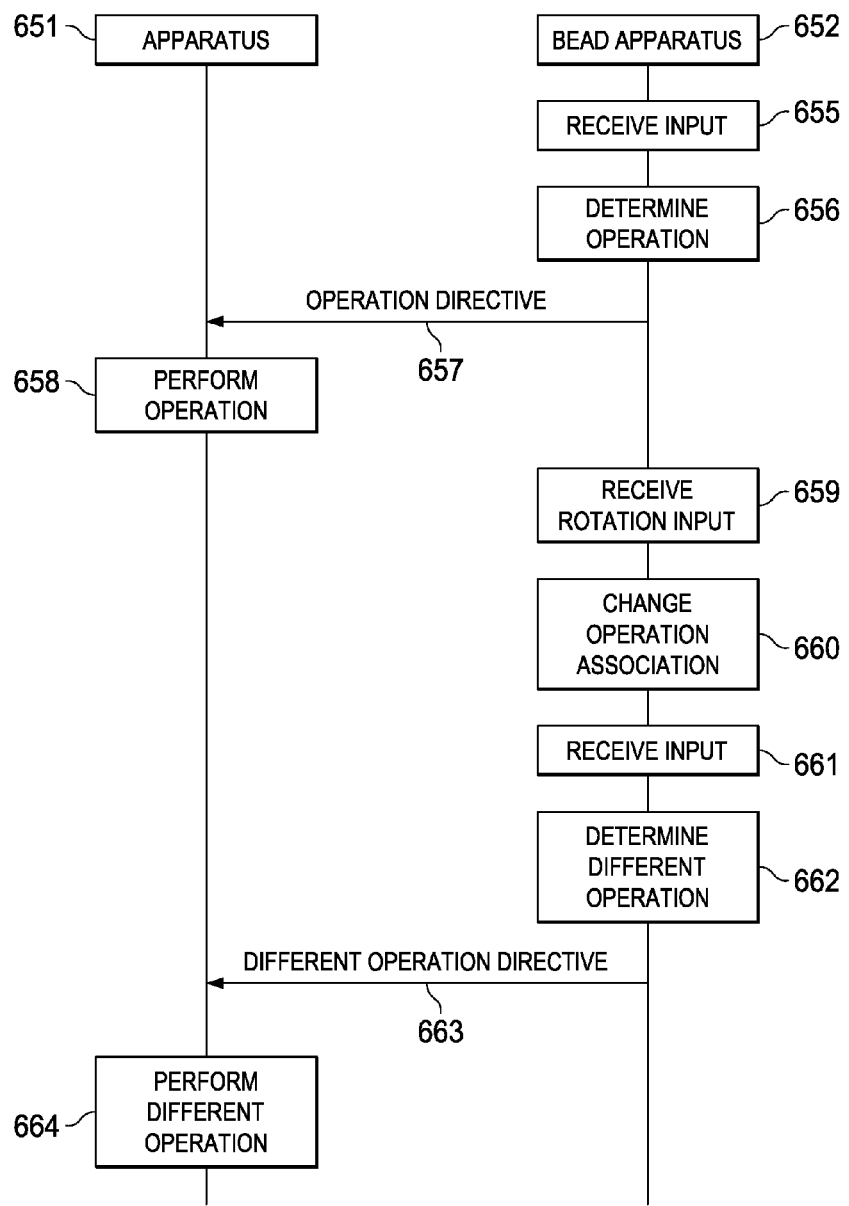

FIG. 6C is an interaction diagram illustrating interaction associated performance of a designated operation according to at least one example embodiment. The example of FIG. 6C is merely an example of interaction associated with performance of a designated operation, and does not limit the scope of the claims. For example, communications may vary, order of communications may vary, apparatuses may vary, and/or the like.

The example of FIG. 6C may relate to an example of the bead apparatus associating a designated operation of a designated program of a separate apparatus with itself. The apparatus may be considered separate from the bead apparatus, for at least, the reason that the bead apparatus is distinct from the apparatus.

In at least one example embodiment, the bead apparatus receives an indication of input that is indicative of rotation around a suspension axis of the bead apparatus. The bead apparatus may cause itself to be associated with a different designated operation of the designated program of the separate apparatus, based, at least in part on the input. In at least one example embodiment, an input that is not indicative of rotation of the bead apparatus, such as a touch input, may cause performance of the different designated operation. In at least one example embodiment, the designated operation and the different designated operation are comprised in an ordered set of designated operations, such as the example of FIG. 4A, associated with the designated program. In at least one example embodiment, the different designated operation is based, at least in part, on an amount of rotation of the separate bead apparatus. For example, the amount of rotation may cause the apparatus to associate a different designated operation that is adjacent to the designated operation in an ordered set of designated operations, that is further away than adjacent from the designated operation in an ordered set of designated operations, and/or the like.

In some circumstances, it may be desirable for a user to be able to exchange operations associated with different bead apparatuses with each other. For example, it may be desirable to exchange a designated operation and designated program associated with a bead apparatus with a different designated operation of a different designated program associated with a different bead apparatus. For example, the user may perform an input, such as the input of FIG. 3C, in relation to two adjacent bead apparatuses. In such circumstances, one of the bead apparatuses may send information indicative of the designated operation and designated program to the other bead apparatus. In such an example, the bead apparatus may receive information indicative of a different designated operation of a different designated program from the other bead apparatus, and associate itself with the different designated operation and the different designated program.

The example of FIG. 6C illustrates interaction between apparatus 651 and bead apparatus 652 according to at least one example embodiment. In the example of FIG. 6C, bead apparatus 652 receives an indication of an input at block 655, similarly as described regarding block 553 of FIG. 5C. At block 656, bead apparatus 652 determines a designated operation associated with the input, similarly as described regarding block 554 of FIG. 5C. At interaction 657, bead apparatus 652 sends an operation invocation directive to apparatus 651, similarly as described regarding interaction 555 of FIG. 5C. At block 658, apparatus 651 performs the designated operation based, at least in part, on the operation invocation directive, similarly as described regarding block 556 of FIG. 5C.

At block 659, bead apparatus 652 receives an indication of an input indicative of rotation of the bead apparatus around a suspension axis of the bead apparatus. The receipt, the indication of input, the rotation, and the axis may be similar as described regarding FIG. 2, and FIGS. 3A-3C. At block 660, apparatus 651 causes association between itself and the designated operation to change to a different designated operation. Bead apparatus 562 receives an indication of another input at block 661. The receipt, the indication, and the other input may be similar as described regarding FIGS. 3A-3C.

At block 662, bead apparatus 652 determines a different designated operation associated with the other input. The determination and the different designated operation may be similar as described regarding FIGS. 4A-4B. The determination of the different designated operation may comprise determining that the apparatus is associated with a different designated operation of the designated program of a separate apparatus. The determination, the association, the designated operation, may be similar as described regarding FIGS. 4A-4B. The determination of the different designated operation may comprise determining that the other input is indicative of invocation of the other designated operation. The determination may be similar as described regarding FIGS. 4A-4B.

At interaction 663, bead apparatus 652 sends a different operation invocation directive to apparatus 651. The sending and the different operation invocation directive may be similar as described regarding FIGS. 4A-4B. Sending the different operation invocation directive may comprise determining the different operation invocation directive indicative of the different designated operation. The determination may be similar as described regarding FIGS. 4A-4B. The sending of the different operation invocation directive may comprise causing the designated program to run on the apparatus. The causation of running may be similar as described regarding FIGS. 4A-4B.

At block 664, apparatus 651 performs the different designated operation based, at least in part, on the different operation invocation directive. The performance of the different operation may be similar as described regarding FIGS. 4A-4B.

Figure 6D:
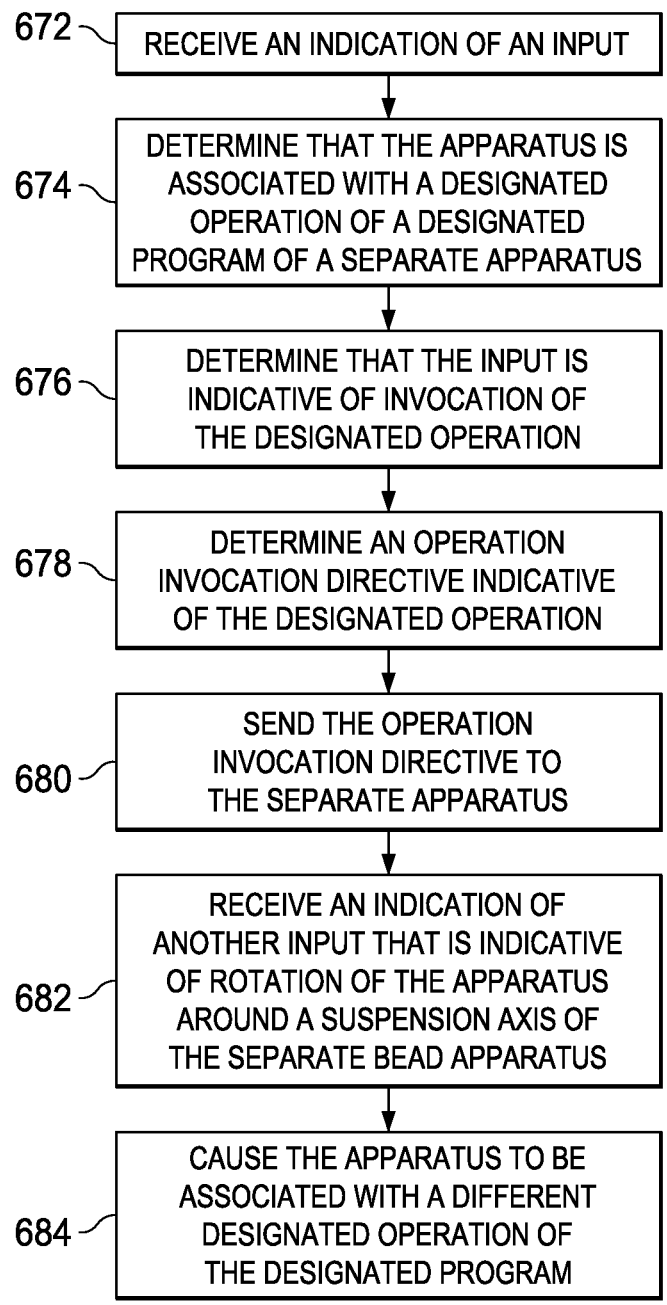

FIG. 6D is a flow diagram illustrating activities associated with performance of a designated operation according to at least one example embodiment. In at least one example embodiment, there is a set of operations that corresponds with the activities of FIG. 6D. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6D.

The example of FIG. 6D may relate to an example of the bead apparatus associating a designated operation of a designated program of a separate apparatus with itself. From the perspective of the bead apparatus, the bead apparatus may be referred to as the apparatus. In this manner, any apparatus that is distinct from the bead apparatus may be considered to be a separate apparatus.

At block 672, the apparatus receives an indication of an input, similarly as described regarding block 572 of FIG. 5D. At block 674, the apparatus determines that the apparatus is associated with a designated operation of a designated program of a separate apparatus, similarly as described regarding block 574 of FIG. 5D. At block 676, the apparatus determines that the input is indicative of invocation of the designated operation, similarly as described regarding block 576 of FIG. 5D. At block 678, the apparatus determines an operation invocation directive indicative of the designated operation, similarly as described regarding block 578 of FIG. 5D. At block 680, the apparatus sends the operation invocation directive to the separate apparatus, similarly as described regarding block 580 of FIG. 5D.

At block 682, the apparatus receives an indication of another input that is indicative of rotation of the apparatus around a suspension axis of the apparatus. At block 684, the apparatus causes the apparatus to be associated with a different designated operation of the designated program.

Figure 7A:
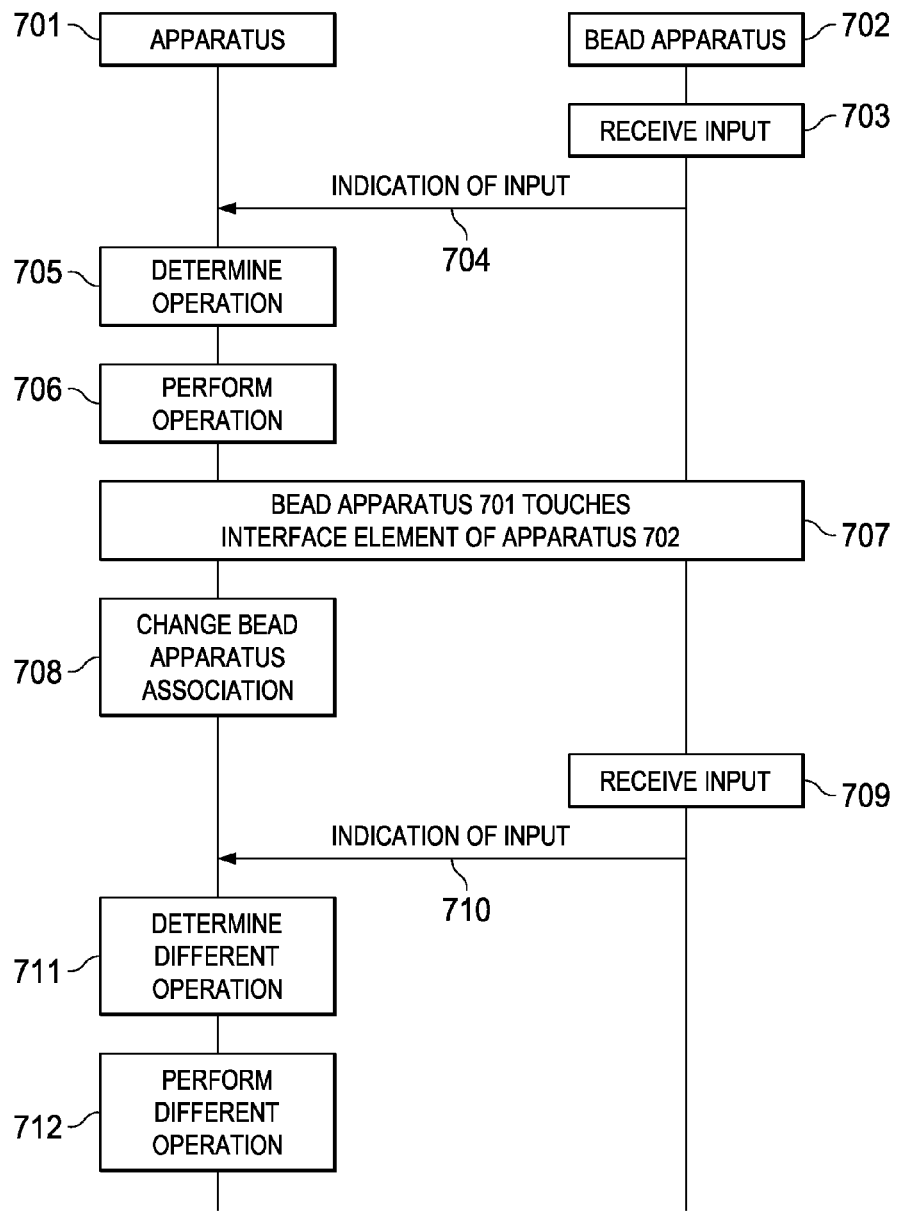
FIGS. 7A-7D are diagrams illustrating activities associated with performance of a designated operation according to at least one example embodiment.

FIG. 7A is an interaction diagram illustrating interaction associated performance of a designated operation according to at least one example embodiment. The example of FIG. 7A is merely an example of interaction associated with performance of a designated operation, and does not limit the scope of the claims. For example, communications may vary, order of communications may vary, apparatuses may vary, and/or the like.

The example of FIG. 7A may relate to an example of the apparatus associating a designated operation of a designated program with a separate bead apparatus. The bead apparatus may be considered separate from the apparatus, for at least, the reason that the bead apparatus is distinct from the apparatus.

In some circumstances, the user may desire to change the designated program and the operation in a simple, quick, and intuitive manner. For example, the user may desire to cause changing of the designated program by touching the bead apparatus to an interface element on a display of the apparatus.

In at least one example embodiment, the apparatus receives an indication of a touch input that corresponds with an interface element of another program. The interface element may be an icon representing the program, text representing the program, and/or the like. In at least one example embodiment, the interface element may be associated with an operation. For example, the interface element may be a button, a menu item, and/or the like. In such an example, the apparatus may cause designation of the other program and designation of another operation that is associated with the interface element such that the separate bead apparatus becomes associated with the designated other operation of the designated other program. In such an example, causation of designation of the other program and the other operation is based, at least in part, on a determination that the touch input relates to the separate bead apparatus touching the apparatus. For example, the causation of designation of the other program and the other operation may be predicated by the determination that the touch input relates to the separate bead apparatus touching the apparatus.

In at least one example embodiment, determination that the touch input relates to the separate bead apparatus touching the apparatus is based on tangible object recognition. There are many available ways to accomplish tangible object recognition, and there will be many ways to accomplish tangible object recognition in the future. Therefore, the scope of the claims is not limited in any way bye the manner in which the apparatus performs tangible object recognition. In at least one example embodiment, tangible object recognition comprises receiving an indication of a touch input from the separate bead apparatus, and determining that the touch input from the separate bead apparatus corresponds with the touch input.

The example of FIG. 7A illustrates interaction between apparatus 701 and bead apparatus 702 according to at least one example embodiment. In the example of FIG. 7A, bead apparatus 702 receives an indication of an input at block 703, similarly as described regarding block 503 of FIG. 5A. At interaction 704, bead apparatus 703 sends an indication of the input to apparatus 701, similarly as described regarding interaction 504 of FIG. 5A. Thus, apparatus 701 receives an indication of the input from the bead apparatus by way of interaction 704. At block 705, apparatus 701 determines that the separate bead apparatus is associated with a designated operation of a designated program, similarly as described regarding block 505 of FIG. 5A. At block 706, apparatus 701 performs the designated operation based, at least in part, on receipt of the indication of the input, similarly as described regarding block 506 of FIG. 5A.

At block 707, apparatus 701 receives an indication that bead apparatus 702 touches an interface element of apparatus 701. At block 708, the apparatus causes designation of the other program and designation of another operation that is associated with the interface element such that bead apparatus 702 becomes associated with the designated other operation of the designated other program.

In the example of FIG. 7A, bead apparatus 702 receives an indication of another input at block 709. The receipt, the indication, and the other input may be similar as described regarding FIGS. 3A-3C. At interaction 710, bead apparatus 702 sends an indication of the other input to apparatus 701. Thus, apparatus 701 receives an indication of the other input from the bead apparatus by way of interaction 710.

At block 711, apparatus 701 determines that bead apparatus 702 is associated with another designated operation of the designated program. The determination, the association, the designated operation, and the designated program may be similar as described regarding FIGS. 4A-4B.

At block 712, apparatus 701 performs the other designated operation based, at least in part, on receipt of the indication of the other input. The performance may be similar as described regarding FIGS. 4A-4B. Performance of the other designated operation may comprise determining that the designated program is not running on the apparatus, and causing the designated program to run on the apparatus. The determination, the running, and the causation of running may be similar as described regarding FIGS. 4A-4B.

Figure 7B:
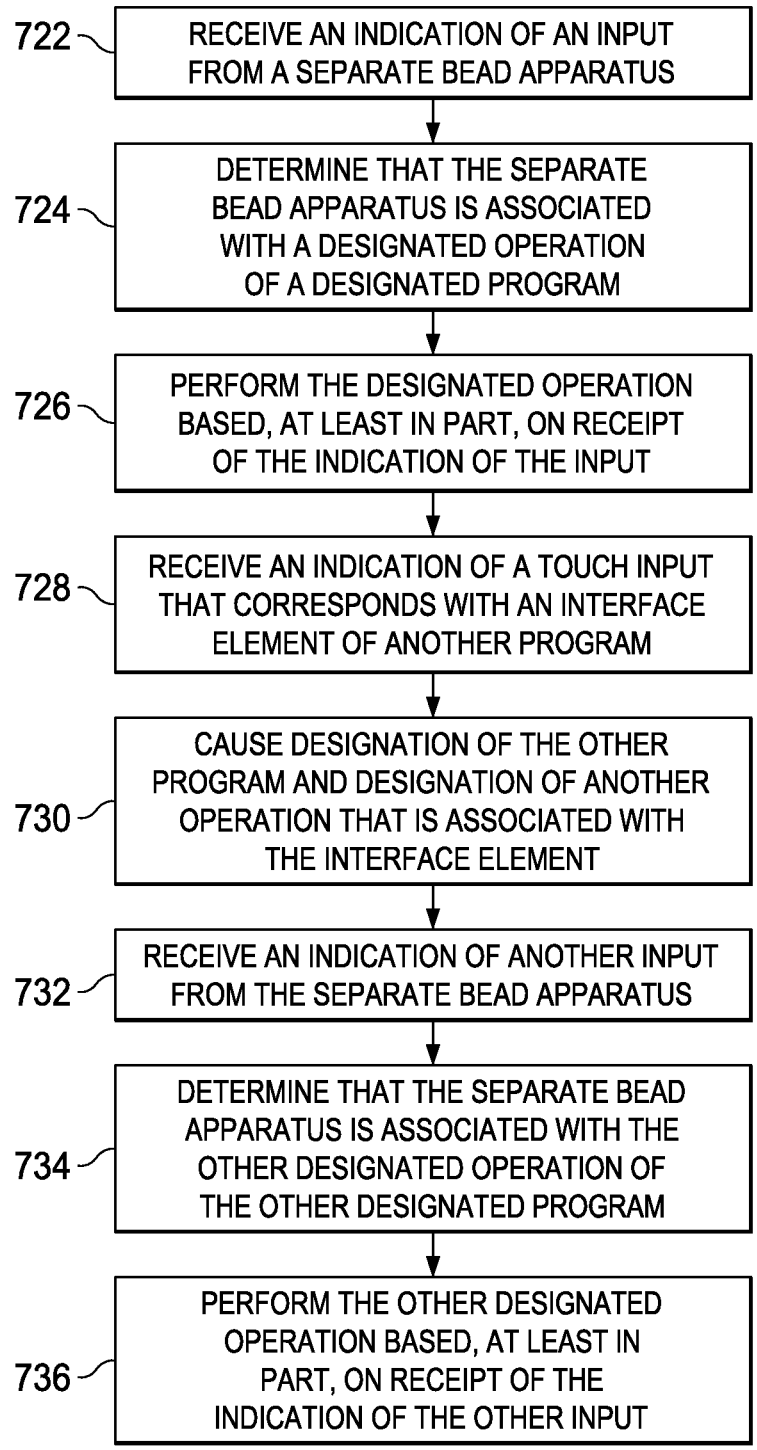

FIG. 7B is a flow diagram illustrating activities associated with performance of a designated operation according to at least one example embodiment. In at least one example embodiment, there is a set of operations that corresponds with the activities of FIG. 7B. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7B.

At block 722, the apparatus receives an indication of an input from a separate bead apparatus, similarly as described regarding block 522 of FIG. 5B. At block 724, the apparatus determines that the separate bead apparatus is associated with a designated operation of a designated program, similarly as described regarding block 524 of FIG. 5B. At block 726, the apparatus performs the designated operation based, at least in part, on receipt of the indication of the input, similarly as described regarding block 526 of FIG. 5B.

At block 728, the apparatus receives an indication of a touch input that corresponds with an interface element of another program.

At block 730, the apparatus causes designation of the other program and designation of another operation that is associated with the interface element such that the separate bead apparatus becomes associated with the designated other operation of the designated other program.

At block 732, the apparatus receives an indication of another input from the separate bead apparatus. The receipt, the indication, the bead apparatus, and the other input may be similar as described regarding FIG. 2 and FIGS. 3A-3C.

At block 734, the apparatus determines that the separate bead apparatus is associated with the other designated operation of the other designated program. The determination, the association, the other designated operation, and the other designated program may be similar as described regarding FIGS. 4A-4B.

At block 736, the apparatus performs the other designated operation based, at least in part, on receipt of the indication of the other input. The performance may be similar as described regarding FIGS. 4A-4B. Performance of the other designated operation may comprise determining that the other designated program is not running on the apparatus, and causing the other designated program to run on the apparatus. The determination, the running, and the causation of running may be similar as described regarding FIGS. 4A-4B.

Figure 7C:
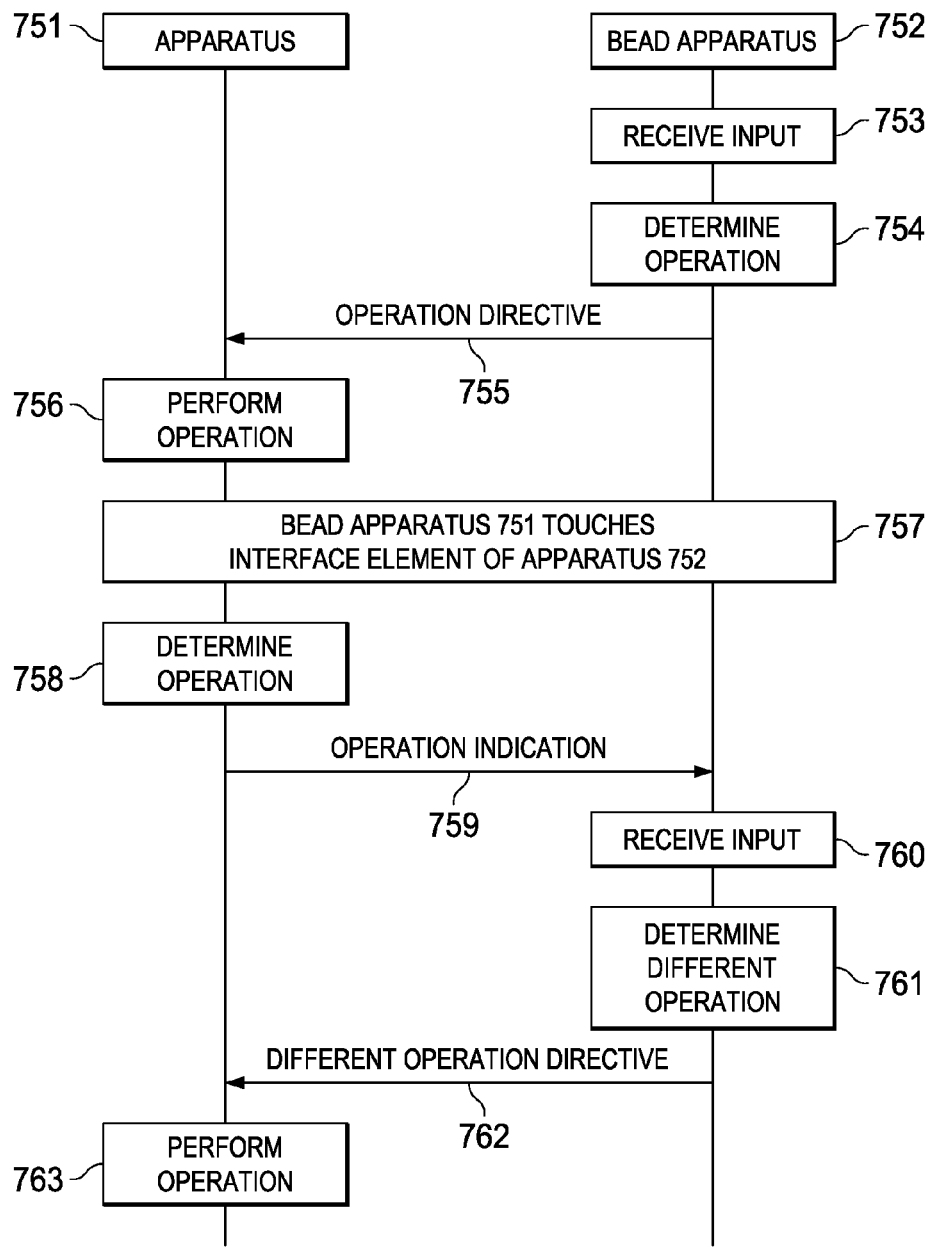

FIG. 7C is an interaction diagram illustrating interaction associated performance of a designated operation according to at least one example embodiment. The example of FIG. 7C is merely an example of interaction associated with performance of a designated operation, and does not limit the scope of the claims. For example, communications may vary, order of communications may vary, apparatuses may vary, and/or the like.

The example of FIG. 7C may relate to an example of the bead apparatus associating a designated operation of a designated program of a separate apparatus with itself. The apparatus may be considered separate from the bead apparatus, for at least, the reason that the bead apparatus is distinct from the apparatus.

In some circumstances, the apparatus may send an operation change directive to the bead apparatus to cause the bead apparatus to become associated with a different designated operation of a different program. In at least one example embodiment, the operation change directive is indicative of the other program and indicative of the other operation.

The example of FIG. 7C illustrates interaction between apparatus 751 and bead apparatus 752 according to at least one example embodiment. In the example of FIG. 7C, bead apparatus 752 receives an indication of an input at block 753, similarly as described regarding block 553 of FIG. 5C. At block 754, bead apparatus 752 determines a designated operation associated with the input, similarly as described regarding block 554 of FIG. 5C. At interaction 755, bead apparatus 752 sends an operation invocation directive to apparatus 751, similarly as described regarding interaction 555 of FIG. 5C. At block 756, apparatus 751 performs the designated operation based, at least in part, on the operation invocation directive, similarly as described regarding block 556 of FIG. 5C.

At block 757, apparatus 751 receives an indication that bead apparatus 752 touches an interface element of apparatus 751. At block 758, apparatus 751 determines a different designated operation and a different designated program based, at least in part on the interface element. At interaction 759, apparatus sends an operation change directive to bead apparatus 752. In at least one example embodiment, sending the operation change directive comprises determining the operation change directive to be indicative of the other designated program and indicative of the other designated operation.

In the example of FIG. 7C, bead apparatus 752 receives an indication of another input at block 760. The receipt, the indication, and the other input may be similar as described regarding FIGS. 3A-3C.

At block 761, bead apparatus 752 determines that the other designated operation is associated with the input. The determination and the other designated operation may be similar as described regarding FIGS. 4A-4B. The determination of the other designated operation may comprise determining that the apparatus is associated with the other designated operation of the other designated program of apparatus 751. The determination, the association, and the other designated operation, may be similar as described regarding FIGS. 4A-4B. The determination of the designated operation may comprise determining that the input is indicative of invocation of the designated operation. The determination may be similar as described regarding FIGS. 4A-4B.

At interaction 762, bead apparatus 752 sends another operation invocation directive to apparatus 751. The sending and the other operation invocation directive may be similar as described regarding FIGS. 4A-4B. Sending the other operation invocation directive may comprise determining the other operation invocation directive indicative of the other designated operation. The determination may be similar as described regarding FIGS. 4A-4B. The sending of the other operation invocation directive may comprise causing the other designated program to run on the apparatus. The causation of running may be similar as described regarding FIGS. 4A-4B.

At block 763, apparatus 751 performs the other designated operation based, at least in part, on the other operation invocation directive. The performance of the other operation may be similar as described regarding FIGS. 4A-4B.

Figure 7D:
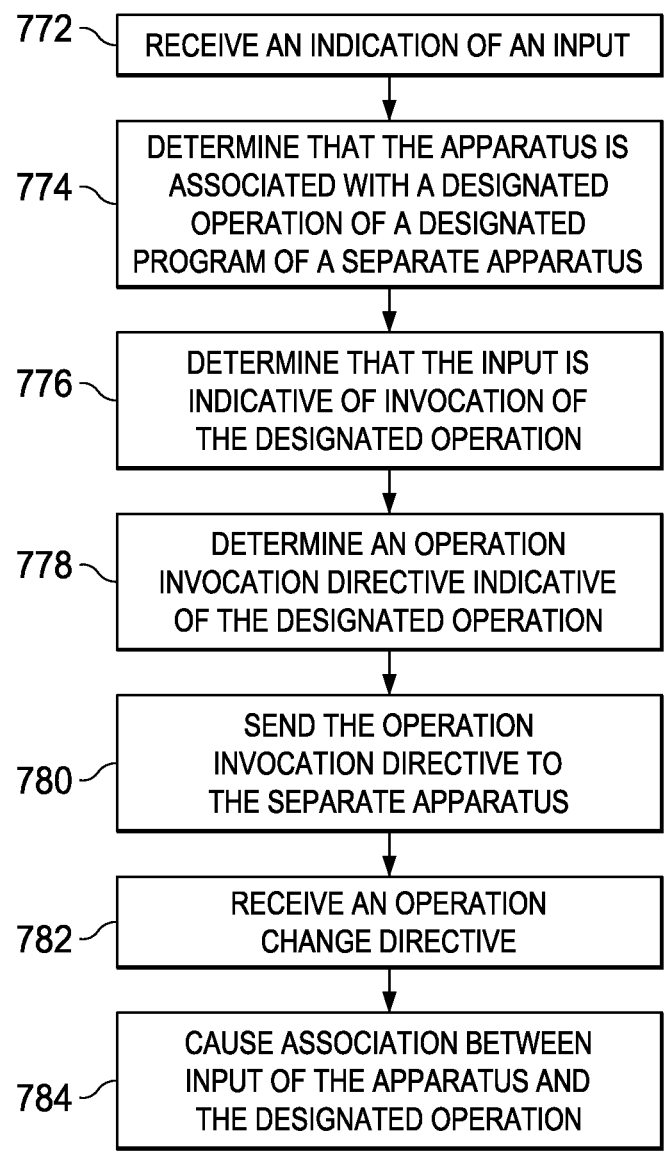

FIG. 7D is a flow diagram illustrating activities associated with performance of a designated operation according to at least one example embodiment. In at least one example embodiment, there is a set of operations that corresponds with the activities of FIG. 7D. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7D.

The example of FIG. 7D may relate to an example of the bead apparatus associating a designated operation of a designated program of a separate apparatus with itself. From the perspective of the bead apparatus, the bead apparatus may be referred to as the apparatus. In this manner, any apparatus that is distinct from the bead apparatus may be considered to be a separate apparatus.

At block 772, the apparatus receives an indication of an input, similarly as described regarding block 572 of FIG. 5D. At block 774, the apparatus determines that the apparatus is associated with a designated operation of a designated program of a separate apparatus, similarly as described regarding block 574 of FIG. 5D. At block 776, the apparatus determines that the input is indicative of invocation of the designated operation, similarly as described regarding block 576 of FIG. 5D. At block 778, the apparatus determines an operation invocation directive indicative of the designated operation, similarly as described regarding block 578 of FIG. 5D. At block 780, the apparatus sends the operation invocation directive to the separate apparatus, similarly as described regarding block 580 of FIG. 5D.

At block 782, the apparatus receives an indication of an operation change directive that identifies another designated operation.

At block 784, the apparatus causes association between input of the apparatus and the other designated operation.

Figure 8A:
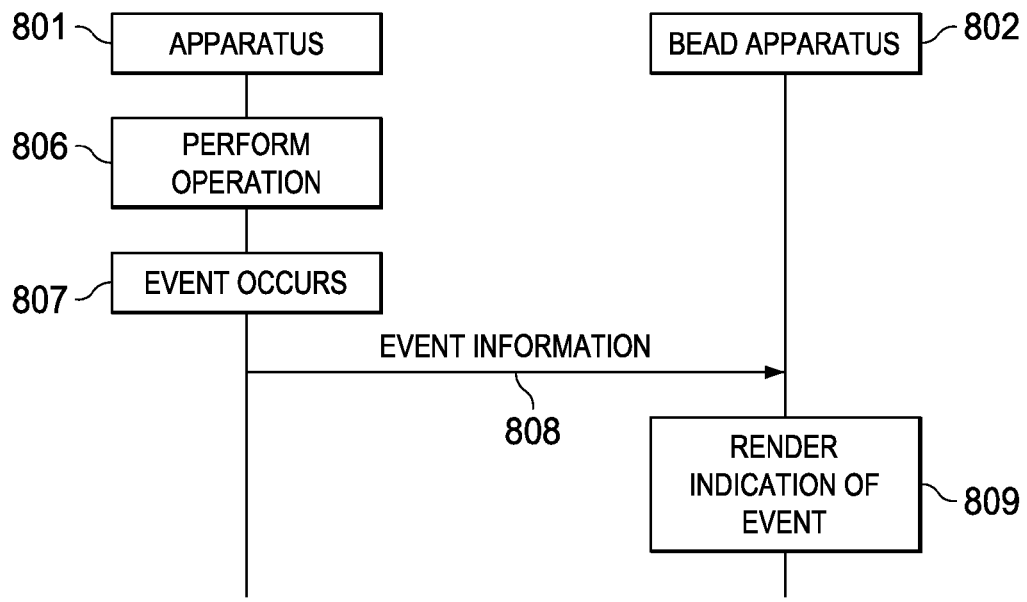
FIGS. 8A-8C are diagrams illustrating activities associated with performance of a designated operation according to at least one example embodiment.

FIG. 8A is an interaction diagram illustrating interaction associated performance of a designated operation according to at least one example embodiment. The example of FIG. 8A is merely an example of interaction associated with performance of a designated operation, and does not limit the scope of the claims. For example, communications may vary, order of communications may vary, apparatuses may vary, and/or the like.

In some circumstances, a user may desire to perceive information associated with performance of an operation by way of an output device of the bead apparatus. For example, the bead apparatus may comprise a light. In such an example, the bead apparatus may indicate information associated with performance of the operation by way of, at least temporarily, causing the light to become lit. For example, the light may become fully lit, partially lit, flashing, and/or the like. The event may relate to receiving content associated with the operation, or occurrence of a milestone associated with the operation. For example, the operation may relate to rendering content, and the event may relate to passage of time associated with the rendering of the content. In such an example, the bead apparatus may indicate the passage of time by way of the output device. In another example, the event may relate to rendering of content becoming within a time threshold from the end of the content. In such an example, the event may relate to causing display of an indication that rendering of the content will terminated within ten seconds.

In at least one example embodiment, the apparatus determines occurrence of an event associated with a designated operation, for example a designated operation that the apparatus is performing. In at least one example embodiment, the apparatus causes rendering of an indication of the event on the bead apparatus, for example, by sending information indicative of the event to the bead apparatus. The information indicative of the event may be any information that conveys occurrence of the event, identity of the event, information describing the event, and/or the like. Upon receiving the information indicative of the event, the bead apparatus may cause rendering of the information indicative of the event. In at least one example embodiment, rendering of the information indicative of the event relates to the output device of the bead apparatus causing a user to perceive a representation of the information indicative of the event, such as by flashing a light, causing display of a representation of the information indicative of the event.

In at least one example embodiment, the bead apparatus may terminate rendering of information indicative of the event based, at least in part, on receiving an indication of an input. For example, the event may relate to receiving a message, and the designated operation associated with the bead apparatus may relate to reading the message. In such an example, the bead apparatus may terminate rendering of the information indicative of the event based, at least in part, on receipt of the input.

Figure 8B:
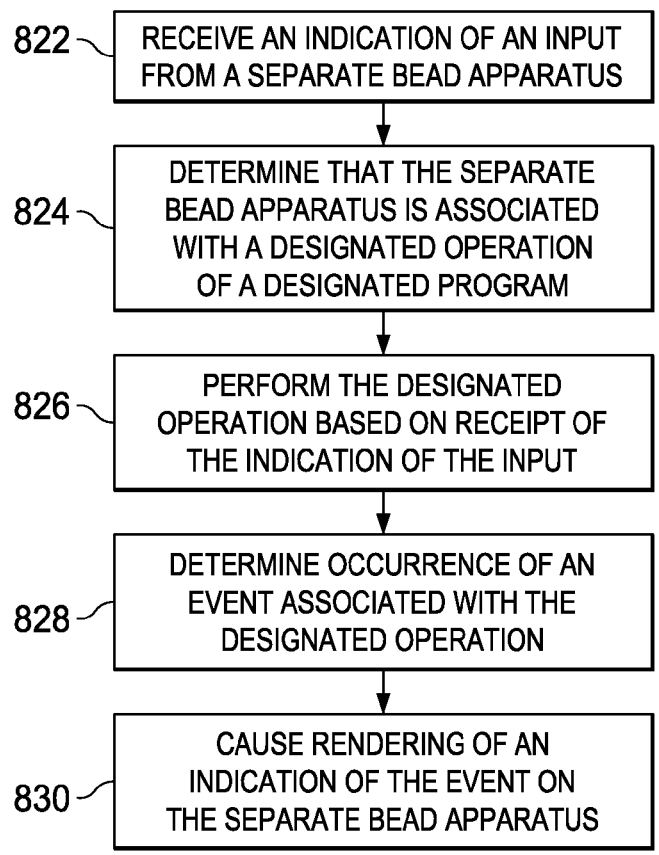

FIG. 8B is a flow diagram illustrating activities associated with performance of a designated operation according to at least one example embodiment. In at least one example embodiment, there is a set of operations that corresponds with the activities of FIG. 8B. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8B.

At block 822, the apparatus receives an indication of an input from a separate bead apparatus, similarly as described regarding block 522 of FIG. 5B. At block 824, the apparatus determines that the separate bead apparatus is associated with a designated operation of a designated program, similarly as described regarding block 524 of FIG. 5B. At block 826, the apparatus performs the designated operation based, at least in part, on receipt of the indication of the input, similarly as described regarding block 526 of FIG. 5B.

At block 828, the apparatus determines occurrence of an event associated with the designated operation. At block 830, the apparatus causes rendering of an indication of the event on the separate bead apparatus. For example, the apparatus causes rendering of an indication of the event on the separate bead apparatus by sending information indicative of the event to the separate bead apparatus.

Figure 8C:
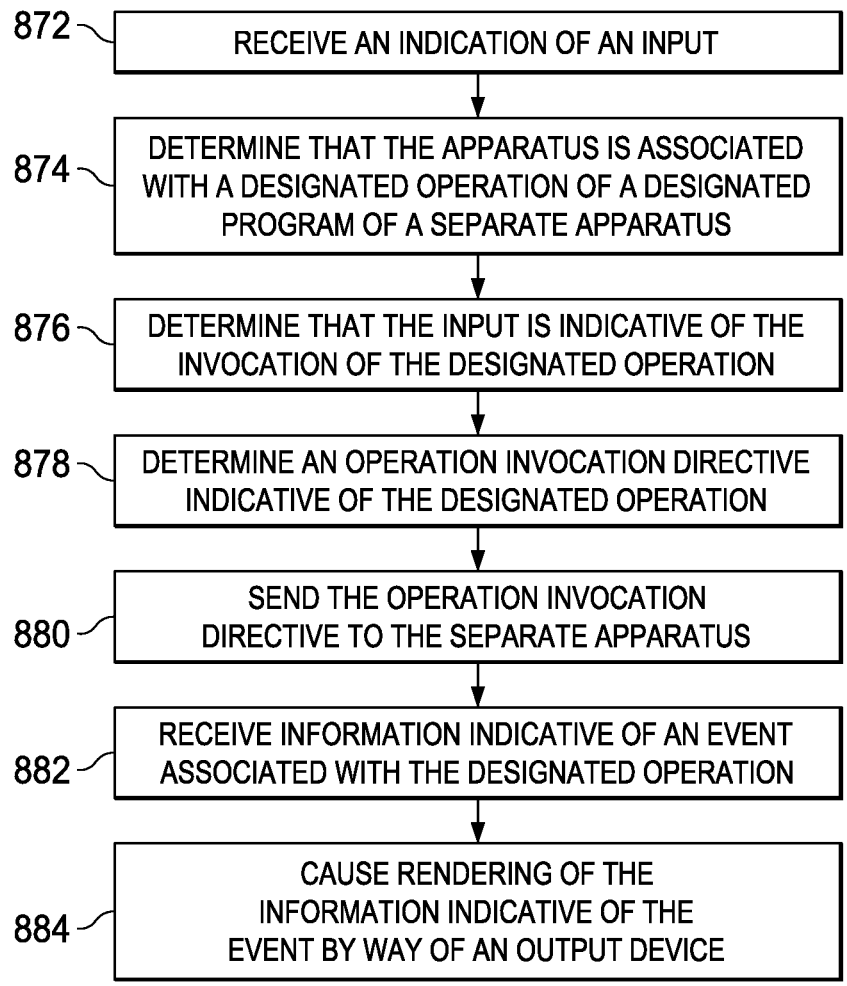

FIG. 8C is a flow diagram illustrating activities associated with performance of a designated operation according to at least one example embodiment. In at least one example embodiment, there is a set of operations that corresponds with the activities of FIG. 8C. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8C.

The example of FIG. 8C may relate to an example of the bead apparatus associating a designated operation of a designated program of a separate apparatus with itself. The apparatus may be considered separate from the bead apparatus, for at least, the reason that the bead apparatus is distinct from the apparatus.

At block 872, the apparatus receives an indication of an input, similarly as described regarding block 572 of FIG. 5D. At block 874, the apparatus determines that the apparatus is associated with a designated operation of a designated program of a separate apparatus, similarly as described regarding block 574 of FIG. 5D. At block 876, the apparatus determines that the input is indicative of invocation of the designated operation, similarly as described regarding block 576 of FIG. 5D. At block 878, the apparatus determines an operation invocation directive indicative of the designated operation, similarly as described regarding block 578 of FIG. 5D. At block 880, the apparatus sends the operation invocation directive to the separate apparatus, similarly as described regarding block 580 of FIG. 5D.

At block 882, the apparatus receives, from the separate apparatus, information indicative of an event associated with the designated operation. At block 884, the apparatus causes rendering of the information indicative of the event by way of an output device of the apparatus.

Figure 9A:
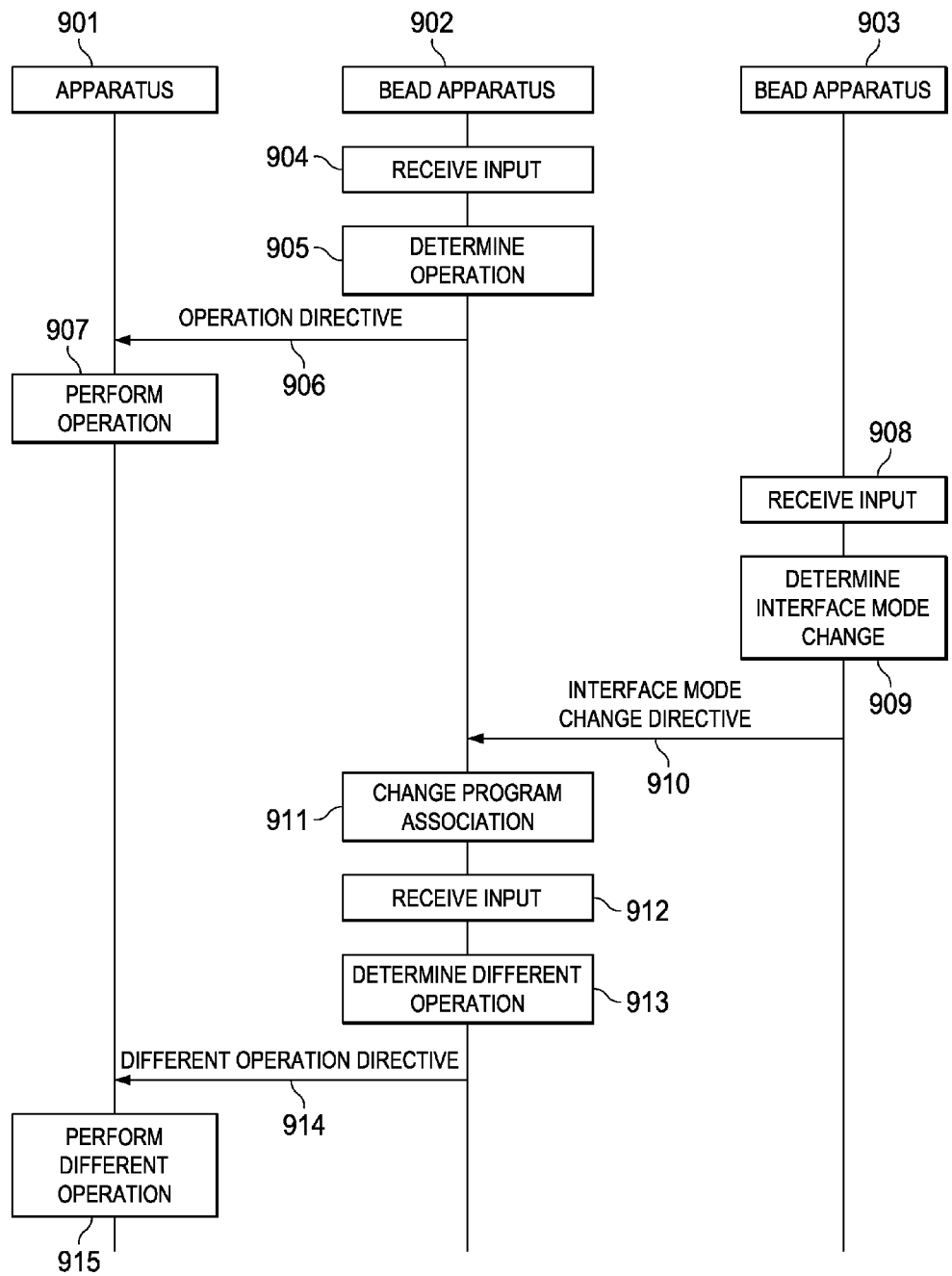
FIGS. 9A-9C are diagrams illustrating activities associated with performance of a designated operation according to at least one example embodiment.

FIG. 9A is an interaction diagram illustrating interaction associated performance of a designated operation according to at least one example embodiment. The example of FIG. 9A is merely an example of interaction associated with performance of a designated operation, and does not limit the scope of the claims. For example, communications may vary, order of communications may vary, apparatuses may vary, and/or the like.

In some circumstances, it may be desirable for a bead apparatus to perform an operation of another bead apparatus. For example, a user may desire to change an interface mode of a bead apparatus by performing an input on another bead apparatus. For example the user may desire to change an interface mod of the apparatus by performing a rotation input on the other bead apparatus.

In at least one example embodiment, the bead apparatus utilizes bead operation program that comprises the instructions executed by the bead apparatus. In at least one example embodiment, the bead operation program may be a designated program associated with another bead apparatus. In such an example, the designated operation may relate to an interface mode change operation. In this manner, the other bead apparatus may cause the bead apparatus to change its interface mode in a similar manner in which bead apparatuses cause operations to be performed on other apparatatuses. In at least one example embodiment, the other bead apparatus causes the bead apparatus to change its interface mode by sending an interface mode change directive to the bead apparatus. In at least one example embodiment, the interface mode change directive comprises information indicative of the second interface mode. For example, the interface mode change directive may identify an interface mode to be utilized, may instruct the bead apparatus to change to an adjacent interface mode in an ordered set of interface modes, and/or the like.

The example of FIG. 9A illustrates interaction between apparatus 901 bead apparatus 902, and bead apparatus 903 according to at least one example embodiment. In the example of FIG. 9A, bead apparatus 902 receives an indication of an input at block 904, similarly as described regarding block 553 of FIG. 5C. At block 905, bead apparatus 902 determines a designated operation associated with the input, similarly as described regarding block 554 of FIG. 5C. At interaction 906, bead apparatus 902 sends an operation invocation directive to apparatus 901, similarly as described regarding interaction 555 of FIG. 5C. At block 907, apparatus 901 performs the designated operation based, at least in part, on the operation invocation directive, similarly as described regarding block 556 of FIG. 5C.

At block 908, bead apparatus 903 receives an indication of an input, similarly as described regarding block 553 of FIG. 5C. At block 909, the apparatus determines a mode change operation associated with bead apparatus 902. Determining the mode change operation may comprise determining that the apparatus is associated with an interface mode change operation of a bead operational program of bead apparatus 902. Determining the mode change operation may comprise determining that the input is indicative of invocation of the mode change operation.

At interaction 910, bead apparatus 903 sends a mode change directive to bead apparatus 902. The sending of the mode change directive may comprise determining the interface mode change directive to be indicative of the mode change operation. At block 911, bead apparatus 902 causes itself to become associated with a different designated program indicated by the interface mode change directive. The indication of a designated program by an interface mode may be similar as described regarding FIG. 4B.

In the example of FIG. 9A, bead apparatus 902 receives an indication of another input at block 912, similarly as described regarding block 553 of FIG. 5C. At block 913, bead apparatus 902 determines that the different designated operation is associated with the other input, similarly as described regarding block 554 of FIG. 5C. At interaction 914, bead apparatus 902 sends another operation invocation directive to apparatus 901, similarly as described regarding interaction 555 of FIG. 5C. At block 915, apparatus 901 performs the different designated operation based, at least in part, on the other operation invocation directive, similarly as described regarding block 556 of FIG. 5C.

Figure 9B:
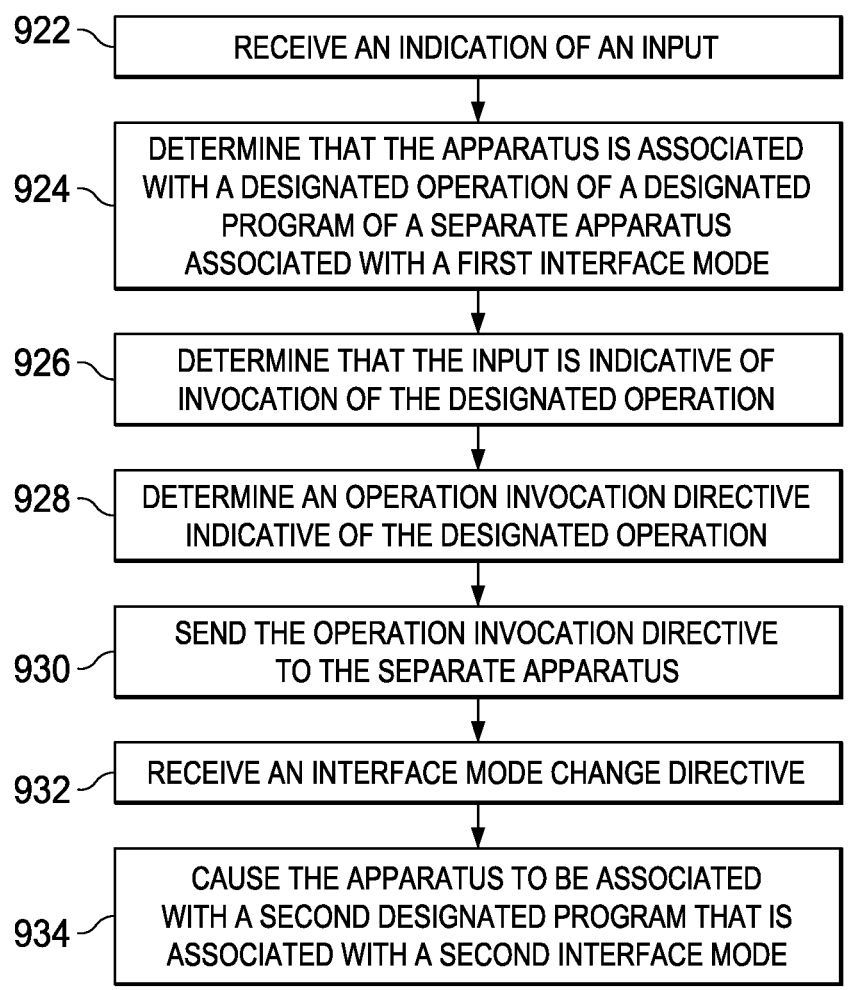

FIG. 9B is a flow diagram illustrating activities associated with performance of a designated operation according to at least one example embodiment. In at least one example embodiment, there is a set of operations that corresponds with the activities of FIG. 9B. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9B.

The example of FIG. 9B may relate to an example of the bead apparatus associating a designated operation of a designated program of a separate apparatus with itself. From the perspective of the bead apparatus, the bead apparatus may be referred to as the apparatus. In this manner, any apparatus that is distinct from the bead apparatus may be considered to be a separate apparatus. For example another bead apparatus may be a separate bead apparatus.

At block 922, the apparatus receives an indication of an input, similarly as described regarding block 572 of FIG. 5D. At block 924, the apparatus determines that the apparatus is associated with a designated operation of a designated program of a separate apparatus associated with a first interface mode. The determination, the association, the designated operation, and the first interface mode may be similar as described regarding FIGS. 4A-4B.

At block 926, the apparatus determines that the input is indicative of invocation of the designated operation, similarly as described regarding block 576 of FIG. 5D. At block 928, the apparatus determines an operation invocation directive indicative of the designated operation, similarly as described regarding block 578 of FIG. 5D. At block 930, the apparatus sends the operation invocation directive to the separate apparatus, similarly as described regarding block 580 of FIG. 5D.

At block 932, the apparatus receives an interface mode change directive. The interface mode change directive may be indicative of a change to a second interface mode. At block 934, the apparatus causes itself to be associated with a second designated program that is associated with a second designated program. The second designated program may be associated with the second interface mode, similarly as described regarding FIG. 4B.

Figure 9C:
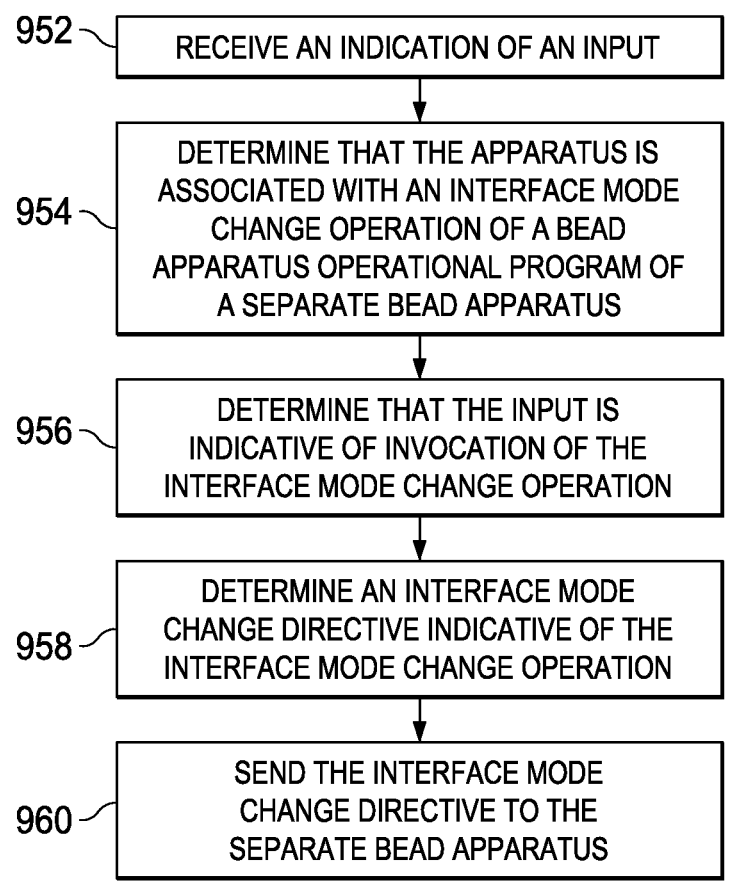

FIG. 9C is a flow diagram illustrating activities associated with performance of a designated operation according to at least one example embodiment. In at least one example embodiment, there is a set of operations that corresponds with the activities of FIG. 9C. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9C.

The example of FIG. 9B may relate to an example of the bead apparatus associating a designated operation of a designated program of a separate apparatus with itself. From the perspective of the bead apparatus, the bead apparatus may be referred to as the apparatus. In this manner, any apparatus that is distinct from the bead apparatus may be considered to be a separate apparatus. For example another bead apparatus may be a separate bead apparatus.

In at least one example embodiment, the apparatus may be a bead apparatus in communication with a separate bead apparatus such that the apparatus is associated with a designated program of the separate bead apparatus operational program and a designated operation of an interface mode change operation. In such an example, the apparatus may determine an operation invocation directive that is an interface mode change directive.

At block 952, the apparatus receives an indication of an input, similarly as described regarding block 572 of FIG. 5D. At block 954, the apparatus determines that the apparatus is associated with an interface mode change operation of a bead apparatus operational program of a separate bead apparatus. At block 956, the apparatus determines that the input is indicative of invocation of the mode change operation. At block 958, the apparatus determines an interface mode change directive indicative of the interface mode change operation. At block 960, the apparatus sends the interface mode change directive to the separate bead apparatus.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 574 of FIG. 5D may be performed after block 576. Furthermore, if desired, one or more of the above-described functions may be optional or may be combined. For example, blocks 578 and 580 of FIG. 5D may be optional and/or combined with interaction 555 of FIG. 5C.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claim.

What is claimed is:

1. An apparatus, comprising:
   at least one processor; and
   at least one memory including computer program code, the memory and the computer program code configured to, working with the processor, cause the apparatus to perform at least the following:
   receiving an indication of an input from a separate bead apparatus comprising a plurality of beads;
   determining that the input relates to rotation of a bead of the separate bead apparatus around a suspension axis of the bead of the separate bead apparatus;
   determining that the bead by which the input was provided is associated with a designated operation of a designated program; and
   performing the designated operation based, at least in part, on receipt of the indication of the input, wherein performing the designated operation comprises causing at least one of a decrement of a value of a parameter of the designated program in proportion to an amount of rotation of the bead of the separate bead apparatus, or an increment of the value of the parameter in proportion to an amount of rotation of the bead of the separate bead apparatus, wherein the amount of the decrement or the increment is determined based on a change in an outward facing surface of the bead.

2. The apparatus of claim 1, wherein multiple beads of the separate bead apparatus are each associated with a distinct designated operation.

3. The apparatus of claim 1 wherein the input is indicative of a touch input on a surface of the bead of the separate bead apparatus and the memory comprises computer program code configured to, working with the processor, cause the apparatus to perform:
   receiving an indication of another input that is indicative of rotation of the bead of the separate bead apparatus around a suspension axis of the separate bead apparatus; and
   in response to the indication of the rotation, causing the bead of the separate bead apparatus to be associated with a different designated operation of the designated program.

4. The apparatus of claim 3, wherein the memory comprises computer program code configured to, working with the processor, cause the apparatus to perform:
   receiving another indication of another input that is indicative of a touch input on a surface of the bead of the separate bead apparatus;
   determining that the bead of the separate bead apparatus is associated with the different designated operation of the designated program; and
   performing the designated operation based, at least in part, on receipt of the indication of the input.

5. The apparatus of claim 1, wherein the memory comprises computer program code configured to, working with the processor, cause the apparatus to perform:
   receiving an indication of a touch input that corresponds with an interface element of another program; and
   causing designation of the other program and designation of another operation that is associated with the interface element such that the bead of the separate bead apparatus becomes associated with the designated other operation of the designated other program.

6. The apparatus of claim 1, wherein the memory comprises computer program code configured to, working with the processor, cause the apparatus to perform:
   determining occurrence of an event associated with the designated operation; and
   causing rendering of an indication of the event on the separate bead apparatus.

7. The apparatus of claim 1, wherein the apparatus further comprises an input device.

8. A method comprising:
   receiving an indication of an input from a separate bead apparatus comprising a plurality of beads;
   determining that the input relates to rotation of a bead of the separate bead apparatus around a suspension axis of the bead of the separate bead apparatus;
   determining that a bead by which the input was provided is associated with a designated operation of a designated program; and
   performing the designated operation based, at least in part, on receipt of the indication of the input, wherein performing the designated operation comprises causing at least one of a decrement of a value of a parameter of the designated program in proportion to an amount of rotation of the bead of the separate bead apparatus, or an increment of the value of the parameter in proportion to an amount of rotation of the bead of the separate bead apparatus, wherein the amount of the decrement or the increment is determined based on a change in an outward facing surface of the bead.

9. The method of claim 8, wherein multiple beads of the separate bead apparatus are each associated with the designated program.

10. The method of claim 8, wherein the input is indicative of a touch input on a surface of the separate bead apparatus and further comprising:
    receiving an indication of another input that is indicative of rotation of the bead of the separate bead apparatus around a suspension axis of the bead of the separate bead apparatus; and
    in response to the indication of the rotation, causing the bead of the separate bead apparatus to be associated with a different designated operation of the designated program.

11. The method of claim 8, further comprising:
    receiving another indication of another input that is indicative of a touch input on a surface of the bead of the separate bead apparatus;

determining that the bead of the separate bead apparatus is associated with the different designated operation of the designated program; and performing the designated operation based, at least in part, on receipt of the indication of the input.

12. The method of claim 8, further comprising:

receiving an indication of a touch input that corresponds with an interface element of another program; and causing designation of the other program and designation of another operation that is associated with the interface element such that the bead of the separate bead apparatus becomes associated with the designated other operation of the designated other program.

13. The method of claim 8, further comprising:

determining occurrence of an event associated with the designated operation; and causing rendering of an indication of the event on the separate bead apparatus.

14. At least one non-transitory computer-readable medium encoded with instructions that, when executed by a processor, perform:

receiving an indication of an input from a separate bead apparatus comprising a plurality of beads;

determining that the input relates to rotation of a bead of the separate bead apparatus around a suspension axis of the bead of the separate bead apparatus;

determining that the bead by which the input was provided is associated with a designated operation of a designated program; and performing the designated operation based, at least in part, on receipt of the indication of the input, wherein performing the designated operation comprises causing at least one of a decrement of a value of a parameter of the designated program in proportion to an amount of rotation of the bead of the separate bead apparatus, or an increment of the value of the parameter in proportion to an amount of rotation of the bead of the separate bead apparatus, wherein the amount of the decrement or the increment is determined based on a change in an outward facing surface of the bead.

15. The medium of claim 14, wherein multiple beads of the separate bead apparatus are each associated with a distinct designation operation.

16. The medium of claim 14, wherein the input is indicative of a touch input on a surface of the bead of the separate bead apparatus and wherein the instructions that, when executed by a processor, further perform:

receiving an indication of another input that is indicative of rotation of the bead of the separate bead apparatus around a suspension axis of the bead of the separate bead apparatus; and in response to the indication of the rotation, causing the bead of the separate bead apparatus to be associated with a different designated operation of the designated program.

17. The medium of claim 16, wherein the instructions that, when executed by a processor, further perform:

receiving another indication of another input that is indicative of a touch input on a surface of the bead of the separate bead apparatus;

determining that the bead of the separate bead apparatus is associated with the different designated operation of the designated program; and performing the designated operation based, at least in part, on receipt of the indication of the input.

\* \* \* \* \*